US012036183B2

(12) United States Patent
Davis et al.

(10) Patent No.: US 12,036,183 B2
(45) Date of Patent: Jul. 16, 2024

(54) FLUID TRANSFER CONNECTOR

(71) Applicant: Avent, Inc., Alpharetta, GA (US)

(72) Inventors: Benjamin M. Davis, Woodstock, GA (US); Mark M. Costello, County Mayo (IE); Brian Ledwith, County Galway (IE)

(73) Assignee: Avent, Inc., Alpharetta, GA (US)

( * ) Notice: Subject to any disclaimer, the term of this patent is extended or adjusted under 35 U.S.C. 154(b) by 365 days.

(21) Appl. No.: 17/088,915

(22) Filed: Nov. 4, 2020

(65) Prior Publication Data

US 2021/0045971 A1 Feb. 18, 2021

Related U.S. Application Data

(62) Division of application No. 15/440,105, filed on Feb. 23, 2017, now Pat. No. 10,857,068.

(60) Provisional application No. 62/423,484, filed on Nov. 17, 2016, provisional application No. 62/384,848, (Continued)

(51) Int. Cl.

| | |
|---|---|
| ***A61J 1/20*** | (2006.01) |
| ***A61J 1/14*** | (2023.01) |
| ***B65D 41/04*** | (2006.01) |
| ***B65D 43/16*** | (2006.01) |
| ***B65D 47/14*** | (2006.01) |

(Continued)

(52) U.S. Cl.
CPC ........... *A61J 1/2096* (2013.01); *A61J 1/1412* (2013.01); *A61J 1/1425* (2015.05); *A61J 1/1481* (2015.05); *A61J 1/1487* (2015.05); *A61J 1/2048* (2015.05); *A61J 1/2065* (2015.05); *B65D 41/0485* (2013.01); *B65D 43/163* (2013.01); *B65D 47/14* (2013.01); *B65D 47/141* (2013.01); *B65D 51/24* (2013.01); *B67D 7/0288* (2013.01)

(58) Field of Classification Search
CPC ...... A61J 1/1425; A61J 1/1487; A61J 1/2096; A61J 1/2048; A61M 39/10; A61M 2039/1094; B65D 43/163
See application file for complete search history.

(56) References Cited

U.S. PATENT DOCUMENTS 2,477,598 A ‡ 8/1949 Hain ...................... G01N 33/26 366/33
3,307,752 A ‡ 3/1967 Anderson ............ B65D 23/108 222/46

(Continued)

FOREIGN PATENT DOCUMENTS

DE 7740288 U1 5/1978
DE 8613738 U1 7/1986

(Continued)

OTHER PUBLICATIONS

Letter to Enteral Component Manufacturers, FDA, Jul. 9, 2010 (Year: 2010).*

(Continued)

*Primary Examiner* — Timothy P. Kelly
(74) *Attorney, Agent, or Firm* — Dority & Manning, P.A.

(57) ABSTRACT

A fluid transfer connector or adapter for coupling to a container or pharmacy bottle for facilitating the transfer of fluid or medicine from the bottle to a syringe, or from the syringe to the bottle. Optionally, an additional connector can be provided for coupling the fluid transfer connector to the syringe.

3 Claims, 16 Drawing Sheets

Related U.S. Application Data filed on Sep. 8, 2016, provisional application No. 62/299,210, filed on Feb. 24, 2016.

(51) Int. Cl.
*B65D 51/24* (2006.01)
*B67D 7/02* (2010.01)

(56) References Cited

U.S. PATENT DOCUMENTS 3,473,833 A ‡ 10/1969 Bremer .................. B29C 65/48 285/28
3,572,337 A ‡ 3/1971 Schunk ................. A61J 7/0053 604/77
3,904,062 A ‡ 9/1975 Grussen ............. B65D 41/3447 215/25
4,046,145 A ‡ 9/1977 Choksi .................. A61J 1/2096 604/40
4,230,112 A ‡ 10/1980 Smith .................. A61J 1/2096 141/31
4,303,071 A ‡ 12/1981 Smith .................. A61J 1/2096 604/40
4,449,640 A ‡ 5/1984 Finkelstein ............ B65D 41/48 220/27
4,493,348 A ‡ 1/1985 Lemmons ............. A61J 1/2096 141/1
4,508,236 A ‡ 4/1985 Keilman ............... A61J 1/1425 137/58
4,685,173 A ‡ 8/1987 Pavur .................. B60R 16/0222 16/2.2
4,743,229 A ‡ 5/1988 Chu ...................... A61J 1/2096 604/82
4,772,152 A ‡ 9/1988 Gill ..................... F16L 37/0985 403/28
4,842,592 A ‡ 6/1989 Caggiani ............... A61M 39/12 285/33
D303,710 S ‡ 9/1989 Neill .............................. D24/23
4,883,483 A ‡ 11/1989 Lindmayer ............. A61M 5/30 604/41
4,944,736 A ‡ 7/1990 Holtz .................... A61J 1/2096 215/20
4,997,429 A ‡ 3/1991 Dickerhoff ............ A61M 5/162 604/40
5,090,583 A ‡ 2/1992 Hoffman .............. B65D 47/147 215/25
D327,318 S ‡ 6/1992 Dudar ............................ D24/11
5,224,937 A ‡ 7/1993 van der Heiden .... A61J 1/2089 604/19
5,238,130 A ‡ 8/1993 Marques .............. B65D 50/046 215/21
5,242,423 A ‡ 9/1993 Goodsir ................ A61M 39/02 604/24
5,356,406 A ‡ 10/1994 Schraga ................ A61J 1/2096
5,405,339 A ‡ 4/1995 Kohnen ................ A61M 39/12 285/23
5,429,256 A ‡ 7/1995 Kestenbaum ......... A61J 1/2096 215/24
5,451,374 A ‡ 9/1995 Molina ..................... A61J 1/18 215/24
5,454,409 A ‡ 10/1995 McAffer ................... A61J 1/18 141/32
5,484,070 A ‡ 1/1996 Graham ................ A61J 7/0046 215/21
5,509,911 A ‡ 4/1996 Cottone, Sr. ...... A61M 39/1055 604/53
5,573,516 A ‡ 11/1996 Tyner .................... A61M 39/26 137/84
5,573,525 A ‡ 11/1996 Watson ................. A61J 1/2096 215/30
5,598,939 A ‡ 2/1997 Watson ................. A61J 1/2096 215/27
5,620,434 A ‡ 4/1997 Brony ................... A61J 1/2096 141/32
D395,502 S ‡ 6/1998 Deily ............................ D24/11
D398,060 S ‡ 9/1998 Brown .......................... D24/16
5,848,994 A ‡ 12/1998 Richmond ................ A61J 1/10 604/24
5,871,500 A ‡ 2/1999 Jepson .................. A61J 1/2089 604/53
5,902,298 A ‡ 5/1999 Niedospial, Jr. ...... A61J 1/2089 215/24
5,921,419 A ‡ 7/1999 Niedospial, Jr. ...... A61J 1/2096 215/24
5,924,584 A ‡ 7/1999 Hellstrom ............ A61J 1/2096 215/24
5,947,166 A 9/1999 Safabash
5,957,166 A ‡ 9/1999 Safabash ............. B01F 11/0082 141/10
5,971,181 A ‡ 10/1999 Niedospial, Jr. ...... A61J 1/2096 215/24
6,056,135 A ‡ 5/2000 Widman ............... A61J 7/0053 215/50
6,106,502 A ‡ 8/2000 Richmond ................ A61J 1/10 604/24
D435,652 S ‡ 12/2000 Nazarifar ....................... D23/26
6,168,037 B1 ‡ 1/2001 Grimard ............... A61J 1/2096 215/24
6,270,519 B1 ‡ 8/2001 Botts ..................... A61J 7/0046 215/11
6,499,617 B1 ‡ 12/2002 Niedospial, Jr. ...... A61J 1/1412 141/30
D473,647 S ‡ 4/2003 Francavilla .................... D24/12
D474,839 S ‡ 5/2003 Francavilla .................... D24/12
6,592,251 B2 ‡ 7/2003 Edwards ............... B01F 5/0685 366/13
6,666,852 B2 ‡ 12/2003 Niedospial, Jr. ...... A61J 1/2096 604/41
6,726,672 B1 ‡ 4/2004 Hanly ....................... A61J 1/10 215/24
D528,910 S ‡ 9/2006 Kingsley ........................ D7/392
D530,200 S ‡ 10/2006 Kingsley ........................ D9/446
D534,796 S ‡ 1/2007 Falkenburg .................... D23/26
7,284,580 B2 ‡ 10/2007 Dallison ............... A61J 1/2096 141/2
7,387,216 B1 ‡ 6/2008 Smith ................ B65D 47/0842 220/25
7,503,905 B2 ‡ 3/2009 Jessop .................. A61C 9/0026 604/12
7,523,967 B2 ‡ 4/2009 Steppe .................. A61M 39/10 285/40
7,594,681 B2 ‡ 9/2009 DeCarlo ............... A61M 39/10 285/29
7,666,170 B2 ‡ 2/2010 Guala ................... A61M 39/10 604/24
7,717,281 B2 ‡ 5/2010 Baudin .............. B65D 47/0814 215/23
7,740,288 B2 ‡ 6/2010 Mantell ................. A61M 39/10 285/33
7,766,919 B2 ‡ 8/2010 Delmotte ........... A61B 17/8816 606/93
7,799,009 B2 ‡ 9/2010 Niedospial, Jr. ...... A61J 1/2096 604/41
7,811,278 B2 ‡ 10/2010 Knipple, Jr. ...... A61M 16/0672 604/53
D627,899 S ‡ 11/2010 Cofie ............................. D24/22
7,857,284 B2 ‡ 12/2010 Kimball .............. A61M 39/045 251/14
D630,094 S * 1/2011 Maxwell ........................ D9/454
D630,732 S ‡ 1/2011 Lev ................................ D24/12
7,985,205 B2 ‡ 7/2011 Adams ................ A61J 15/0015 604/17
D644,618 S ‡ 9/2011 Morihira ........................ D13/19
8,016,795 B2 ‡ 9/2011 Barrelle ................ A61M 5/284 604/18
8,051,997 B2 ‡ 11/2011 Buckley ................. A47G 23/16 215/23

(56) References Cited

U.S. PATENT DOCUMENTS

| | | | | | |
|---|---|---|---|---|---|
| 8,109,902 | B2 ‡ | 2/2012 | Middleton | A61J 1/2096 | 604/82 |
| 8,152,790 | B2 ‡ | 4/2012 | Lopez | A61M 39/10 | 604/53 |
| 8,177,768 | B2 ‡ | 5/2012 | Leinsing | B01L 3/50825 | 604/41 |
| 8,245,870 | B2 ‡ | 8/2012 | McKinney | B65D 55/16 | 220/37 |
| 8,272,411 | B2 ‡ | 9/2012 | Py | B65D 47/248 | 141/30 |
| 8,303,571 | B2 ‡ | 11/2012 | Kraushaar | A61M 39/105 | 604/53 |
| 8,328,768 | B2 ‡ | 12/2012 | Quigley | A61M 1/367 | 604/24 |
| D674,277 | S ‡ | 1/2013 | Hanson | D9/446 | |
| 8,398,607 | B2 ‡ | 3/2013 | Fangrow, Jr. | A61M 39/10 | 604/50 |
| 8,444,621 | B2 ‡ | 5/2013 | Fremming | A61B 5/150732 | 604/40 |
| 8,459,312 | B2 ‡ | 6/2013 | Manera | B65D 47/2031 | 141/27 |
| D686,339 | S ‡ | 7/2013 | Shima | D24/22 | |
| 8,479,370 | B2 ‡ | 7/2013 | Grant | A61J 15/0026 | 29/525 |
| 8,529,524 | B2 ‡ | 9/2013 | Newton | A61M 39/045 | 604/24 |
| D691,261 | S ‡ | 10/2013 | Kawamura | D24/13 | |
| 8,551,068 | B2 ‡ | 10/2013 | Kyle | A61M 39/165 | 604/41 |
| D693,923 | S ‡ | 11/2013 | Hernandez | D24/12 | |
| 8,613,738 | B2 ‡ | 12/2013 | Mantell | A61M 39/10 | 604/53 |
| 8,641,685 | B2 ‡ | 2/2014 | Mansour | A61M 39/1011 | 604/25 |
| 8,679,090 | B2 ‡ | 3/2014 | Anderson | A61M 39/26 | 604/53 |
| D705,059 | S * | 5/2014 | Hutchison | D9/447 | |
| D706,135 | S ‡ | 6/2014 | Hutchison | D9/447 | |
| 8,753,325 | B2 ‡ | 6/2014 | Lev | A61J 1/2096 | 604/40 |
| 8,758,322 | B2 ‡ | 6/2014 | McCoy | B65D 1/02 | 604/40 |
| D712,025 | S ‡ | 8/2014 | Kawamura | D24/11 | |
| D714,142 | S ‡ | 9/2014 | Hojo | D9/436 | |
| D714,935 | S ‡ | 10/2014 | Nishioka | D24/13 | |
| 8,852,167 | B2 ‡ | 10/2014 | Trombley, III | A61M 39/12 | 604/53 |
| 8,870,834 | B2 ‡ | 10/2014 | Milijasevic | A61M 5/16877 | 604/24 |
| D716,636 | S ‡ | 11/2014 | McDonald | D8/354 | |
| D717,948 | S ‡ | 11/2014 | Strong | D24/13 | |
| 8,926,840 | B2 ‡ | 1/2015 | Hull | B01D 39/18 | 210/28 |
| D723,181 | S ‡ | 2/2015 | Kawamura | D24/22 | |
| D725,284 | S ‡ | 3/2015 | Karlsson | D24/21 | |
| 9,017,295 | B2 ‡ | 4/2015 | Pan | A61M 39/10 | 604/24 |
| 9,033,938 | B2 ‡ | 5/2015 | Milijasevic | A61M 5/16877 | 604/24 |
| D731,065 | S ‡ | 6/2015 | Winter | D24/16 | |
| 9,073,021 | B2 ‡ | 7/2015 | Nakamura | A61J 1/20 | |
| D736,914 | S ‡ | 8/2015 | Schultz | D24/12 | |
| D736,915 | S ‡ | 8/2015 | Schultz | D24/12 | |
| 9,095,500 | B2 ‡ | 8/2015 | Brandenburger | B65D 51/002 | |
| D737,962 | S ‡ | 9/2015 | Schultz | D24/12 | |
| 9,126,029 | B2 ‡ | 9/2015 | Fangrow | A61M 39/10 | |
| 9,149,623 | B1 ‡ | 10/2015 | Colman | A61B 5/097 | |
| 9,156,569 | B2 ‡ | 10/2015 | Vassallo | B65D 47/0804 | |
| 9,205,243 | B2 ‡ | 12/2015 | Lopez | A61M 39/26 | |
| 9,205,248 | B2 ‡ | 12/2015 | Wu | A61M 39/24 | |
| 9,289,587 | B2 ‡ | 3/2016 | Colman | F16L 37/244 | |
| 9,296,531 | B2 ‡ | 3/2016 | Luzbetak | A61J 9/00 | |
| D756,200 | S ‡ | 5/2016 | McDonald | D8/354 | |
| 9,345,639 | B2 ‡ | 5/2016 | Ferrara | A61J 7/0053 | |
| 9,345,642 | B2 ‡ | 5/2016 | Heath | A61J 1/2096 | |
| 9,427,715 | B2 ‡ | 8/2016 | Palazzolo | B01F 5/0685 | |
| 9,433,562 | B2 ‡ | 9/2016 | Ingram | A61M 1/062 | |
| 9,926,185 | B2 * | 3/2018 | Davis | B67D 3/0041 | |
| 10,001,236 | B2 ‡ | 6/2018 | Lewis | A61M 39/1011 | |
| 2003/0088232 | A1 ‡ | 5/2003 | Duell | A61J 1/1487 | 604/41 |
| 2004/0238776 | A1 | 12/2004 | Peters et al. | | |
| 2005/0055008 | A1 ‡ | 3/2005 | Paradis | A61J 1/1475 | 604/40 |
| 2005/0209555 | A1 ‡ | 9/2005 | Middleton | A61J 1/2096 | 604/82 |
| 2006/0108319 | A1 ‡ | 5/2006 | Meittunen | A61J 1/1425 | 215/38 |
| 2006/0217679 | A1 ‡ | 9/2006 | Hanly | A61M 39/26 | 604/40 |
| 2007/0076401 | A1 ‡ | 4/2007 | Carrez | A61J 15/0026 | 361/81 |
| 2007/0214692 | A1 ‡ | 9/2007 | Ferrara | A61J 1/2096 | 40/324 |
| 2008/0015539 | A1 ‡ | 1/2008 | Pieroni | A61J 1/2096 | 604/40 |
| 2008/0183153 | A1 ‡ | 7/2008 | Enns | A61M 39/20 | 604/53 |
| 2008/0312640 | A1 ‡ | 12/2008 | Grant | A61J 15/0026 | 604/53 |
| 2009/0230075 | A1 ‡ | 9/2009 | Springer | B65D 47/247 | 215/22 |
| 2009/0321611 | A1 ‡ | 12/2009 | Moberg | B23H 7/26 | 249/17 |
| 2010/0022951 | A1 ‡ | 1/2010 | Ferrera | A61M 39/0613 | 604/10 |
| 2011/0054436 | A1 ‡ | 3/2011 | Griffis, III | A61J 1/2096 | 604/40 |
| 2011/0130740 | A1 ‡ | 6/2011 | Levy | A61J 1/05 | 604/40 |
| 2011/0168292 | A1 * | 7/2011 | Luzbetak | B65D 47/0804 | 141/2 |
| 2012/0103470 | A1 ‡ | 5/2012 | Terwilliger | A61J 1/2096 | 141/34 |
| 2012/0104054 | A1 ‡ | 5/2012 | Terwilliger | A61J 1/1418 | 222/56 |
| 2012/0216909 | A1 ‡ | 8/2012 | Levy | A61J 7/0053 | 141/2 |
| 2012/0315353 | A1 * | 12/2012 | Becsi | A61J 9/00 | 141/2 |
| 2013/0030379 | A1 * | 1/2013 | Ingram | A61J 1/1475 | 604/218 |
| 2014/0020788 | A1 ‡ | 1/2014 | Kyle | B65B 3/003 | 141/18 |
| 2014/0174578 | A1 ‡ | 6/2014 | Bonnal | A61M 39/26 | 137/79 |
| 2014/0246616 | A1 ‡ | 9/2014 | Fangrow | F16L 29/00 | 251/14 |
| 2014/0276466 | A1 ‡ | 9/2014 | Yeh | A61M 39/26 | 604/25 |
| 2014/0276651 | A1 ‡ | 9/2014 | Schultz | A61M 39/165 | 604/53 |
| 2014/0299568 | A1 ‡ | 10/2014 | Browne | A61J 1/00 | 215/24 |
| 2014/0323995 | A1 ‡ | 10/2014 | Clauson | A61M 5/14276 | 604/29 |
| 2015/0238387 | A1 ‡ | 8/2015 | Caetano | A61J 1/2096 | 604/40 |
| 2015/0238747 | A1 ‡ | 8/2015 | Russo | A61M 39/1011 | 604/53 |
| 2015/0251827 | A1 ‡ | 9/2015 | Campbell | B65D 55/16 | 215/25 |
| 2015/0320638 | A1 ‡ | 11/2015 | Becker | A61M 39/162 | 215/30 |
| 2016/0001056 | A1 ‡ | 1/2016 | Nelson | A61M 39/26 | 604/24 |
| 2016/0015601 | A1 ‡ | 1/2016 | Davidson | A61J 1/2096 | 604/40 |

(56) References Cited

U.S. PATENT DOCUMENTS

| | | | | |
|---|---|---|---|---|
| 2016/0030293 A1 ‡ | 2/2016 | Dorsey | A61M 39/12 604/50 |
| 2016/0038374 A1 ‡ | 2/2016 | Merhold | A61J 1/1487 604/41 |
| 2016/0067147 A1 ‡ | 3/2016 | Davis | B65D 55/16 220/30 |
| 2016/0067422 A1 ‡ | 3/2016 | Davis | A61M 5/3202 604/19 |
| 2016/0067471 A1 ‡ | 3/2016 | Ingram | A61J 1/1412 604/53 |
| 2016/0081878 A1 ‡ | 3/2016 | Marks | A61J 1/2075 604/41 |
| 2016/0143815 A1 ‡ | 5/2016 | Koelper | A61M 39/10 604/53 |
| 2016/0158110 A1 ‡ | 6/2016 | Swisher | A61M 39/1011 604/535 |
| 2016/0159635 A1 ‡ | 6/2016 | Davis | B67D 3/0041 141/36 |
| 2016/0175201 A1 * | 6/2016 | Schuessler | A61M 39/10 604/533 |
| 2016/0206516 A1 ‡ | 7/2016 | Kunishige | A61J 15/0026 |
| 2016/0206845 A1 ‡ | 7/2016 | Colman | A61M 16/0816 |
| 2016/0317393 A1 ‡ | 11/2016 | Davis | A61M 5/345 |
| 2016/0367439 A1 ‡ | 12/2016 | Davis | A61J 1/2089 |
| 2017/0014616 A1 ‡ | 1/2017 | Davis | A61M 31/00 |
| 2017/0045170 A1 ‡ | 2/2017 | Lewis | A61M 39/10 |
| 2017/0239141 A1 ‡ | 8/2017 | Davis | A61J 1/2048 |

FOREIGN PATENT DOCUMENTS

| | | | | |
|---|---|---|---|---|
| DE | 8613738 U1 ‡ | 7/1986 | H01T 13/04 |
| DE | 20302788 U1 | 6/2004 | |
| DE | 20302788 U1 ‡ | 6/2004 | A61M 39/1011 |
| DE | 102005030510 A1 | 1/2007 | |
| DE | 102005030510 A1 ‡ | 1/2007 | A61J 1/2096 |
| EP | 0960616 A2 | 12/1999 | |
| EP | 0960616 A2 ‡ | 12/1999 | A61J 1/1406 |
| EP | 2269685 A2 | 1/2011 | |
| EP | 2269685 A2 ‡ | 1/2011 | A61M 39/26 |
| EP | 2 959 877 A1 | 12/2015 | |
| EP | 3042691 A1 | 7/2016 | |
| EP | 3042691 A1 ‡ | 7/2016 | A61J 15/00 |
| FR | 2930428 A1 | 10/2009 | |
| FR | 2930428 A1 ‡ | 10/2009 | A61J 7/0053 |
| GB | 2 379 253 A | 3/2003 | |
| JP | 4743229 B2 ‡ | 8/2011 | |
| JP | 4743229 B2 | 8/2011 | |
| WO | WO 92/00717 A1 | 1/1992 | |
| WO | WO-9200717 A1 ‡ | 1/1992 | A61J 7/0053 |
| WO | WO 98/03210 A2 | 1/1998 | |
| WO | WO-9803210 A2 ‡ | 1/1998 | A61M 5/50 |
| WO | WO 98/46278 A1 | 10/1998 | |
| WO | WO-9846278 A1 ‡ | 10/1998 | A61L 12/128 |
| WO | WO 99/32155 A2 | 7/1999 | |
| WO | WO-9932155 A2 ‡ | 7/1999 | A61B 17/00491 |
| WO | WO 2005/065767 A2 | 7/2005 | |
| WO | WO-2005065767 A2 ‡ | 7/2005 | A61M 39/26 |
| WO | WO 2005/087127 A1 | 9/2005 | |
| WO | WO 2009/068987 A1 | 6/2009 | |
| WO | WO-2009068987 A1 ‡ | 6/2009 | B65D 47/122 |
| WO | WO 2009/090627 A1 | 7/2009 | |
| WO | WO-2009090627 A1 ‡ | 7/2009 | A61J 1/2096 |
| WO | WO 2012/024370 A1 | 2/2012 | |
| WO | WO-2012024370 A1 ‡ | 2/2012 | A61M 39/10 |
| WO | WO 2013/081699 A2 | 6/2013 | |
| WO | WO-2013081699 A2 ‡ | 6/2013 | A61J 15/001 |
| WO | WO 2014/077670 A1 | 5/2014 | |
| WO | WO 2015/034045 A1 | 3/2015 | |
| WO | WO-2015034045 A1 ‡ | 3/2015 | A61J 15/0026 |
| WO | WO 2015/146831 A1 | 10/2015 | |
| WO | WO 2016/040126 A1 | 3/2016 | |
| WO | WO-2016040126 A1 ‡ | 3/2016 | A61M 5/3134 |
| WO | WO 2016/089869 A1 | 6/2016 | |
| WO | WO-2016089869 A1 ‡ | 6/2016 | A61M 39/10 |
| WO | WO 2018/022631 A1 | 2/2018 | |
| WO | WO-2018022631 A1 ‡ | 2/2018 | A61M 39/10 |

OTHER PUBLICATIONS

CA Bill No. 444, Feb. 23, 2015 (Year: 2015).*
International Search Report & Written Opinion for PCT/US2017/056391; Jan. 18, 2018; 16 pgs.‡
Invitation to Pay Additional Fees for PCT/US2017/019021; Jun. 6, 2017; 12 pgs.‡
Invitation to Pay Additional Fees for PCT/US2018/021856; Jun. 27, 2018; 24 pgs.‡
International Search Report & Written Opinion for PCT/US2017/019021; Sep. 22, 2017; 20 pgs.‡
New ISO Tubing Connector Standards: A Follow-Up to the Sentinel Event Alert Webinar PowerPoint Presentation; www.jointcommission.org; 50 pgs; Dec. 3, 2014.‡
New Tube Feeding Connectors Webinar PowerPoint Presentation; www.oley.org; 24 pgs; Jun. 24, 2014.‡
Non Sterile Luer Lock to Oral Slip Adapter; Health Care Logistics, Inc.; 1 pg; date unknown.‡
Oral Slip to Oral Slip Adapter; Health Care Logistics, Inc.; 1 pg; date unknown.‡
Medispense Stepped Stopper; 1 pg; date unknown.‡
NeoMed Closed System NeoBottle; 1 pg; date unknown.‡
Medi-Dose EPS Press-In Bottle Adapters; 1 pg; date unknown.‡
Total Pharmacy Supply Universal Bottle Adapter; 1 pg; date unknown.‡
Tulip Medical GEMS Syringe Locks & Single-Use Anaerobic Transfers; 1 pg; date unknown.‡
WestPharma Vial Adapters; 2 pgs; 2014.‡
Vygon Fluid Dispensing Connector; 1 pg; date unknown.‡
Sterile Luer Lock to Oral Slip Adapter; Health Care Logistics, Inc.; 1 pg; date unknown.‡
Total Pharmacy Supply Bottle Adapter Plug; 1 pg; date unknown.‡
PDG—The Packaging Design Group Sealsafe Press In Bottle Adapter (PIBA); 1 pg; date unknown.‡
Specialty Medical Products Coupling (Item Code SMP-SCFF); Apr. 10, 2014; 1 pg.‡
International Search Report & Written Opinion for PCT/US2016/023771; Jun. 27, 2016; 17 pgs.‡
International Search Report & Written Opinion for PCT/US2016/038051; Sep. 2, 2016; 13 pgs.‡
International Search Report & Written Opinion for PCT/US2015/064237; 12 pgs; Mar. 3, 2016.‡
Medela Breastmilk Transfer Lid; 1 pg; date unknown.‡
Medicina ENFit Press In Adapter; 18 pgs; date unknown.‡
International Search Report & Written Opinion for PCT/US2016/042514; Nov. 10, 2016; 12 pgs.‡
Iso-Med Press-In Bottle Adapters; 1 pg; date unknown.‡
Baxter AdaptACap Bottle Adapter; 1 pg; date unknown.‡
BioJect Needle-Free Vial Adapter; 1 pg; date unknown.‡
CareFusion Universal Vented Vial Adapter; 2 pgs; 2013.‡
Covidien ENFit Coupling; Mar. 2014; 1 pg.‡
Baxa Adapta-Cap Bottle Adapter; 1 pg; date unknown.‡
Baxa (Baxter) Rapidfill Connector; 1 pg; date unknown.‡
Alternative Syringes Low Displacement Option PowerPoint Presentation; Presented by Rork Swisher of Covidien; ISO 80369 Series Meeting; Berlin Germany; 11 pgs; Mar. 19, 2014.pgs.‡
Invitation to Pay Additional Fees for PCT/US2017/019021; Jun. 6, 2017; 12 pages.
Medicina Superlock enteral feeding system brochure, 14 pages.

* cited by examiner
‡ imported from a related application

FLUID TRANSFER CONNECTOR

CROSS REFERENCE TO RELATED APPLICATIONS

This application is a divisional of U.S. patent application Ser. No. 15/440,105 filed on Feb. 23, 2017, which claims priority to U.S. Provisional Patent Application Ser. No. 62/299,210 filed Feb. 24, 2016, U.S. Provisional Patent Application Ser. No. 62/384,848 filed Sep. 8, 2016 and U.S. Provisional Patent Application Ser. No. 62/423,484 filed Nov. 17, 2016, all of which are hereby incorporated herein by reference in their entireties.

TECHNICAL FIELD

The present invention relates generally to the field of containment, storage and delivery of fluids, and more particularly to a capping device, bottle adaptor or fluid transfer coupling for facilitating the transfer of fluids between a container or pharmacy bottle and a syringe.

BACKGROUND

Various containers are used for the collection, storage and delivery of fluids such as medications, supplements, breast milk, formula, and the like. For example, when dispensing fluid medications that are commonly stored in larger volumes in a pharmacy bottle, and dispensed in smaller prescribed quantities into a smaller container, a syringe may be used to measure and transfer the fluid. Often a transfer lid or cap is used on the larger volume container, allowing easy repeated dispensation from the container. Smaller volume containers typically accept "press-in" or stepped enteral-only adapters for transferring the fluids between the syringe and container.

Continued improvements to the transfer and dispensation of fluids such as fluid medications is sought. It is to the provision of an improved fluid transfer connectors meeting these and other needs that the present invention is primarily directed.

SUMMARY

In example embodiments, the present invention provides a capping device or lid, bottle adaptor or fluid transfer coupling for facilitating in the transfer of fluids from a pharmacy bottle or other container to a syringe or other fluid transfer means.

In one aspect, the present invention relates to a bottle adapter connector including a generally cylindrical body having an outer peripheral surface and an inner peripheral surface; a recess defined by the inner peripheral surface of the body, a base member, and a male coupling generally centrally positioned on the base member, the male coupling includes a conduit extending therethrough.

In example embodiments, the male coupling includes a male ENFIT compatible coupling. In example embodiments, the male ENFIT compatible coupling is configured for engagement with a female ENFIT compatible coupling. In example embodiments, the female ENFIT compatible coupling includes a dosing control coupling for extension within a portion of the conduit of the male ENFIT compatible coupling.

In example embodiments, the outer peripheral surface includes a plurality of laterally offset flanges for providing frictional engagement with an opening of a medicine bottle.

In example embodiments, the bottle adapter has a diameter of between about 12-28 millimeters.

In example embodiments, the adapter can further include an outer collar and a sealing mechanism, wherein the sealing mechanism is configured for fitting around the male coupling and within a recess defined between the outer collar and the male coupling. In example embodiments, the sealing mechanism includes a substantially resilient grommet having a first open end for receiving the male coupling and a substantially closed second end. In example embodiments, the resilient grommet is formed from silicone.

In example embodiments, a cap can be tethered to the body of the bottle adapter. In example embodiments, the base member is substantially flexible and elastically deformable such that the male coupling is movable in an axial direction. In example embodiments, the male coupling extends beyond an end of the body such that closure of a cap atop the connector causes axial displacement of the male coupling, and wherein the conduit is generally sealed with the cap.

In another aspect, the present invention relates to a fluid transfer lid including a generally circular top panel, a first coupling and an attachment collar. The first coupling includes a length and extends longitudinally along a first axis from the circular top panel, and wherein a lumen extends generally axially along the first axis through the first coupling. The attachment collar extends in a second direction from the circular top panel, wherein an internal circumferential face thereof being threaded to releasably engage corresponding threads of a container.

In example embodiments, the first coupling includes a female enteral-only coupling. In example embodiments, the lid can further include an adapter tethered to the lid, wherein the adapter includes a male ENFIT compatible coupling and a male enteral-only coupling generally axially aligned and oppositely extending from a central flange member. In example embodiments, the adapter further includes a closure tethered thereto.

In example embodiments, the lid further includes a second coupling having a length and extending longitudinally along a second axis from the circular top panel, wherein the second axis is generally parallel and spaced a distance relative to the first axis. In example embodiments, the second coupling includes a lumen extending generally axially along the second axis. In example embodiments, the second coupling includes a male ENFIT compatible coupling.

In example embodiments, the lid can further include closures tethered to the lid and capable of moving independently between an open configuration with the closure removed and a closed configuration with the closure engaged with the coupling and sealing the lumen thereof.

In yet another aspect, the present invention relates to a fluid transfer adapter including a disc-shaped body having a first end and a second end, the disc-shaped outer body defining an outer diameter of at least about 2.25 inches, the body comprising a first surface defining a first coupling and a second surface comprising a second coupling. In example embodiments, a conduit extends entirely through the couplings from the first end to the second end.

In example embodiments, the first coupling is generally centrally-positioned on the body and extends towards the first end, and the second coupling is generally axially aligned with the first coupling and extends towards the second end. In example embodiments, the first coupling includes a male ENFIT compatible coupling and the second coupling includes a male enteral-only coupling.

These and other aspects, features and advantages of example embodiments of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIG. 16 shows a cross-sectional view of the bottle adapter transfer connector of FIG. 15.

DETAILED DESCRIPTION OF EXAMPLE EMBODIMENTS

Figure 1:
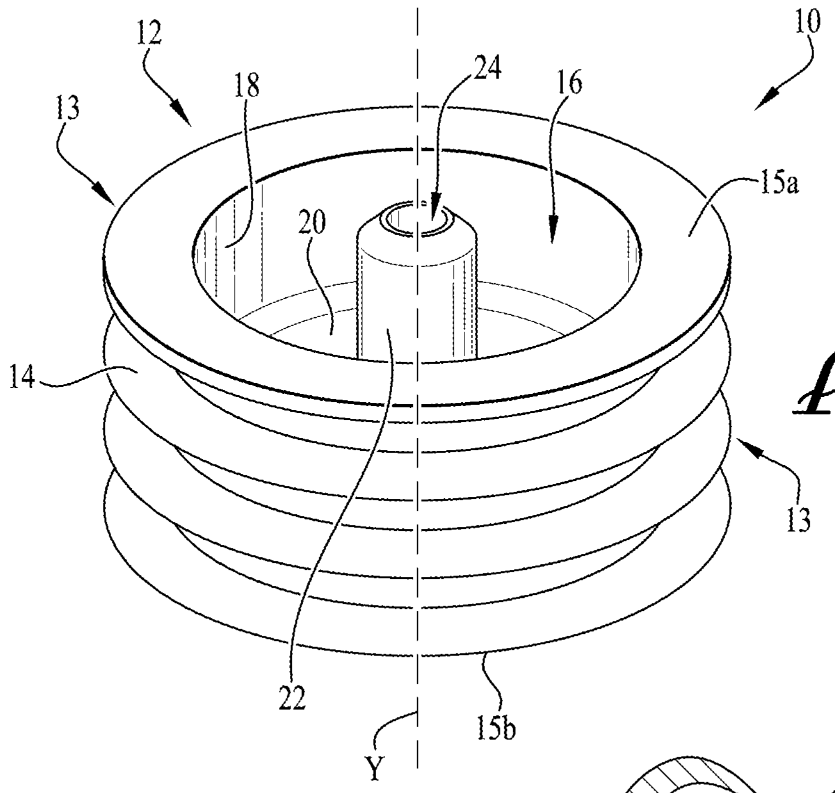
FIG. 1 shows a bottle adapter connector according to an example embodiment of the present invention.
Figure 2:
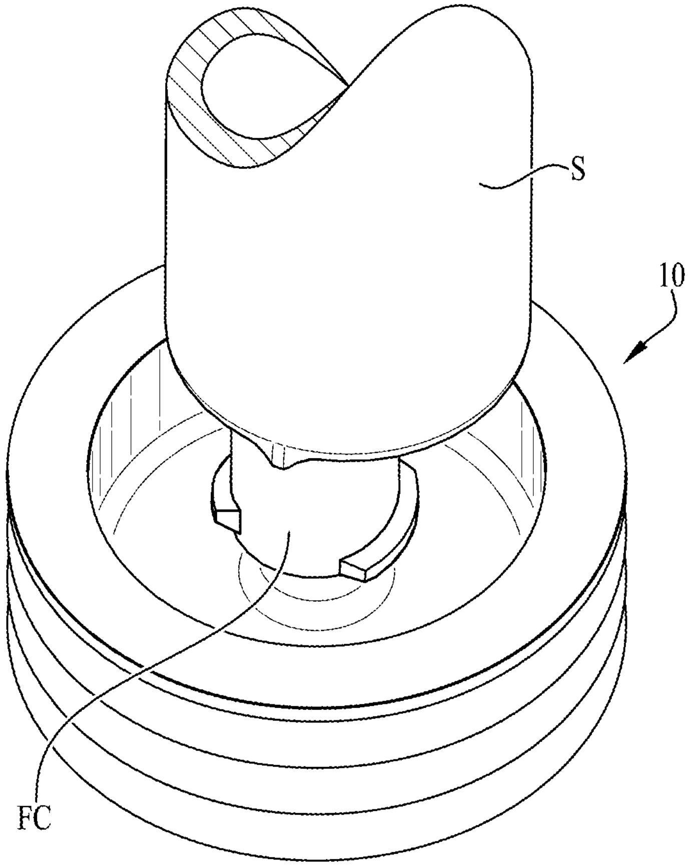
FIG. 2 shows the bottle adapter connector of FIG. 1 comprising a syringe coupled to a male port of the bottle adapter connector.
Figure 3:
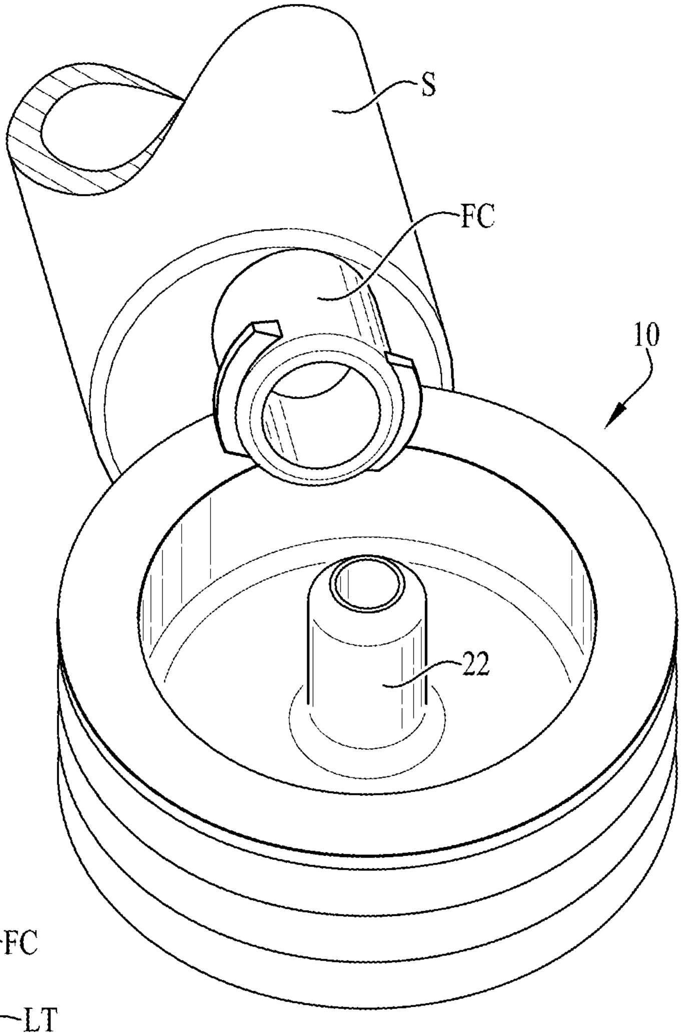
FIG. 3 shows the bottle adapter of FIG. 2 and showing the end coupling of the syringe removed from engagement with the male port.
Figure 4:
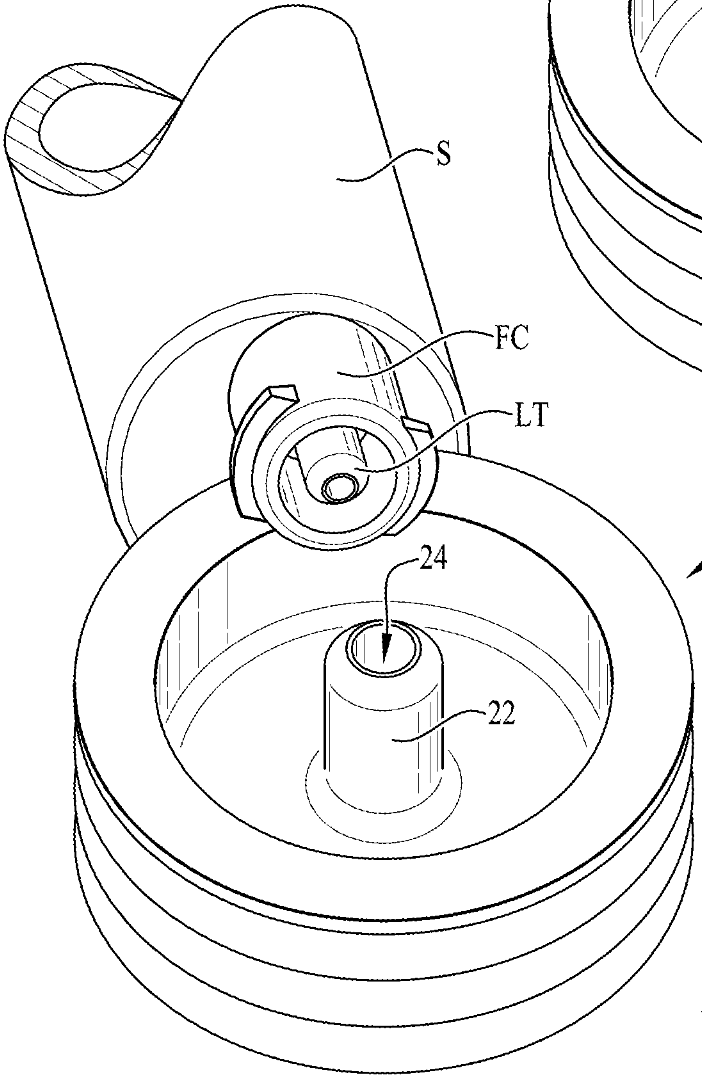
FIG. 4 shows the bottle adapter and end coupling of the syringe of FIG. 3, and showing the end coupling of the syringe comprising a dosing control coupling and being compatible for fitting with the male port of the bottle adapter connector.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-29 show several example embodiments of fluid transfer connectors and adapters for providing the transfer of fluid or medicine from a container or pharmacy bottle to a syringe S, or for example, from the syringe S to the bottle. According to other example embodiments, the fluid transfer connectors and adapters of the present invention are configured for providing engagement between an end connector FC of a syringe S and a conventional enteral-only ported press-in bottle adapter, or for example, a stepped adapter comprising an enteral-only port.

According to example embodiments, the fluid transfer connectors of the present invention comprise connectors that are compatible with the ISO 80369-3 design standard known as ENFIT and are configured for coupling engagement with ENFIT connectors according to the ENFIT design standard, ISO 80369-3, which is incorporated herein by reference. Preferably, the fluid transfer connectors can be sized as desired, for example, to accommodate coupling with containers or bottles of different sized openings. According to some example forms of the invention, the fluid transfer connectors comprise both enteral-only connectors and ENFIT compatible connectors, for example, for providing compatible coupling engagement with enteral-only connectors and ENFIT compatible connectors. Preferably, any of the fluid transfer connectors as described herein can comprise both enteral-only and ENFIT compatible connectors as desired.

FIGS. 1-4 show a bottle adapter connector 10 according to an example embodiment of the present invention. In example embodiments, the bottle adapter connector 10 comprises a cylindrical body 12 comprising an outer peripheral surface 13 that defines a plurality of outer peripheral flanges or steps 14. In example embodiments, the flanges or steps 14 are preferably flexible, resilient and sized to engage with bottle openings of a desirable size. For example, according to example embodiments, the bottle adapter connector 10 is in the form of a "press-in" adapter, for example, such that the flanges or steps 14 along the outer peripheral surface 13 generally frictionally engage the opening of a bottle, for example, the opening of a pharmacy or medicine bottle. In example forms, commonly used bottles most frequently used in medicine practice range between about 2-16 ounces, and the opening thereof will generally vary according to its volume. In example embodiments, the connector 10 can be sized as desired, but can at least be provided in sizes compatible with bottle sizes (and the openings thereof) most frequently used in medicine practice, for example, between a diameter D1 of about 10-40 millimeters, and between about 12-38 millimeters according to one example embodiment (see FIGS. 1 and 5). In example embodiments, the bottle opening or inner diameter thereof is generally between about 12-33 millimeters. In example embodiments, the flanges 14 are generally laterally offset from each other and extend around the entirety of the body to define a continuous flange for providing frictional and sealing engagement with an internal surface or opening of a bottle or container. In example embodiments, the flanges 14 are laterally offset and extend along the length or height H of the connector 10, for example, between the upper and lower surfaces of the body 15*a*, 15*b*. According to one example embodiment, the flanges 14 are resilient and flexible such that the adapter connector 10 can engage a bottle opening having an inner diameter range of up to about 4-5 millimeters difference with respect to the adapter connector diameter. For example, if the bottle opening inner diameter is about 12 millimeters, the diameter D1 of the connector 10 can be up to about 17 millimeters and still provide for fitting and sealing engagement with the bottle opening.

In example embodiments, the connector 10 comprises a recess 16 defined by an inner peripheral surface 18 of the body 12, a base member or floor 20, and a male coupling generally centrally-positioned on the floor 20 and extending towards the upper surface 15*a*. In example embodiments, a central conduit 24 extends entirely through the male coupling 22 along an elongate axis Y that is generally centrally-positioned in the floor 20 and axially aligned with the body 12. In example embodiments, the end coupling FC of a syringe S is compatible for removable engagement with the male coupling 22, for example, such that the syringe can be coupled to the connector 10 to allow transfer of the fluids or medicine between the syringe S and the pharmacy bottle, from the pharmacy bottle to the syringe or from the syringe to the pharmacy bottle. In example embodiments, the male coupling 22 can comprise a male ENFIT compatible coupling and the end coupling FC can comprise a female ENFIT compatible coupling. According to some example embodiments, the syringe S can comprise a dosing control coupling or low dose tip LT, for example, which is compatible for fitting within the conduit 24 when the end coupling FC is coupled with the male coupling 22, and which preferably substantially if not entirely eliminates dosing inaccuracies (see FIG. 4). U.S. Published patent application Ser. No. 15/210,282, Patent Application Publication No. US 2016/0317393, shows a syringe including a dosing control coupling, the entirety of which is hereby incorporated herein by reference for all purposes.

Figure 5:
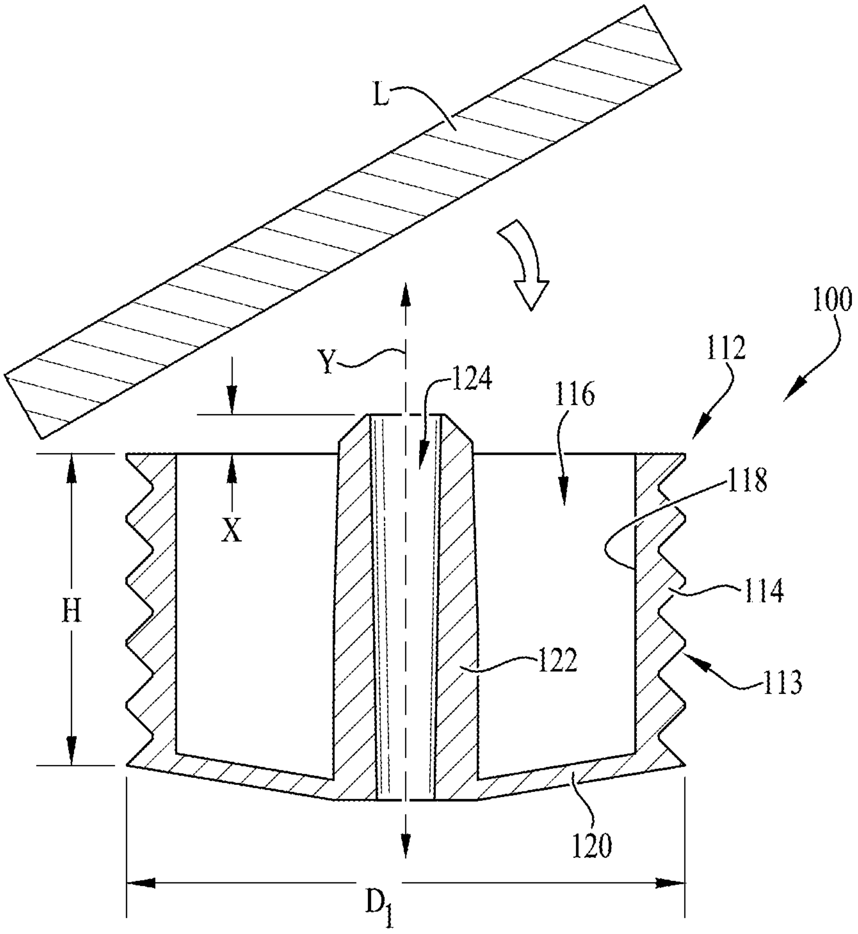
FIGS. 5-6 show a sequence of operation of a bottle adapter connector comprising a flexible floor surface and showing that closing a cap atop the connector causes retraction of the male port and sealing engagement with an interior surface of the cap.
Figure 6:
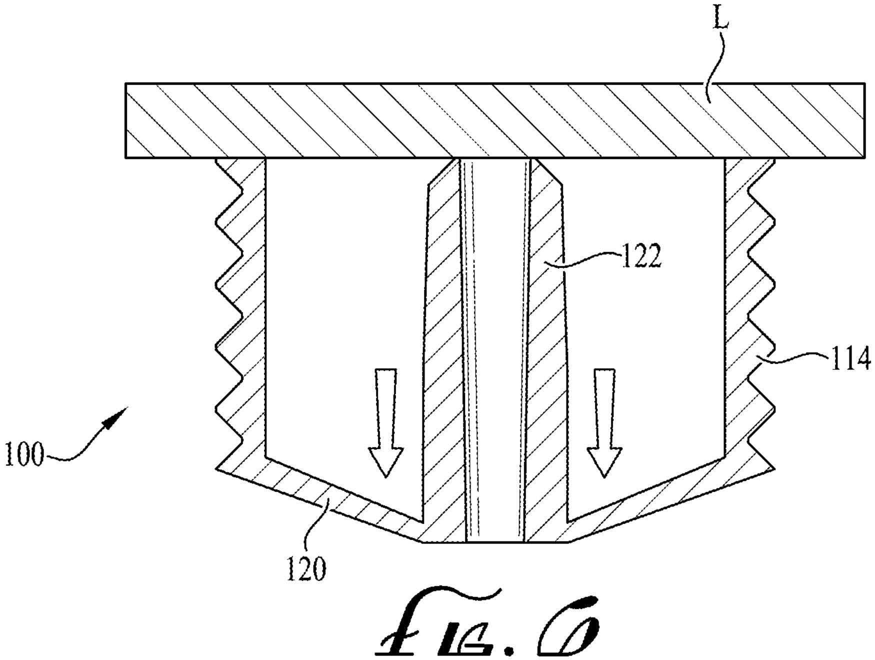

FIGS. 5-6 show a connector 100 according to another example embodiment of the present invention. In example embodiments, the connector 100 is generally similar to the connector 10 as described above and comprises an outer collar body comprising a plurality of outer peripheral flanges or steps 114, a recess portion 116 defined by a floor surface 120, a male coupling 122 centrally positioned and extending from the floor surface 120, and a central conduit 124 extending entirely through the male coupling 122. According to example embodiments, the male coupling 122 extends from the floor surface 120 a distance X above the upper surface 115*a* of the body 112 comprising the outer peripheral surface 113 having the flanges or steps 114. In example embodiments, the distance X is generally between about 0.5-6 millimeters. As depicted in FIG. 6, closure of a lid or cap L atop the connector 100 causes engagement of a surface of the cap L with an end of the male coupling 122, for example, such that the male coupling 122 is generally axially displaced along axis Y within the recess portion 116. In example embodiments, the floor surface 120 is preferably at least partially resilient and flexible to allow for axial displacement of the male coupling 122. Thus, according to example embodiments of the present invention, the floor surface 120 undergoes at least some amount of elastic deformation between when the male coupling 122 is in its neutral state and when the cap L is fastened to the bottle to cause displacement of the male coupling 122. Preferably, by displacing the male coupling within the recess 116 when the cap Lis coupled to the bottle, an end portion of the male coupling 122 is sealingly engaged with the surface of the cap L, for example, such that fluids or medicine within the bottle are prevented from passing through the conduit 124 when the cap L is coupled to the bottle. In example embodiments, the cap L can comprise an anti-tamper or child-resistant lid. Alternatively, the end portion of the male coupling 122 can be configured as desired, for example, to be generally recessed below the upper portion of the collar body, or to be generally flush or planar with the end portion of the collar body. Optionally, a one-way or two-way seal can be provided within at least a portion of the conduit 124, for example, to provide a seal within the conduit 124 when not in use and allow for functionality and transfer of the fluids during use. In one example embodiment, the seal is provided in the conduit rear an upper portion of the male coupling 122. Optionally, the seal is provided in the conduit 124 near the floor surface 120. Further optional, the seal is provided in the conduit 124 between the ends of the male coupling 122.

In example embodiments, the floor surface 120 can be configured to provide at least some amount of flexure or elasticity such that the male coupling 122 can axially move when engaged with the cap L. In some example embodiments, the floor surface 120 can be substantially thin relative to the other portions of the connector 100, or can be formed from one or more flexible and resilient materials that allow for at least some displacement. According to one example embodiment, the floor surface 120 can be formed from a different material relative to the material forming the rest of the connector 100. For example, in some example embodiments, the floor surface 120 can be co-molded or comprise a mixture of two or more materials such that the floor surface 120 exhibits a greater amount of flexibility and elasticity compared to the other components or features of the connector 100.

Figure 7:
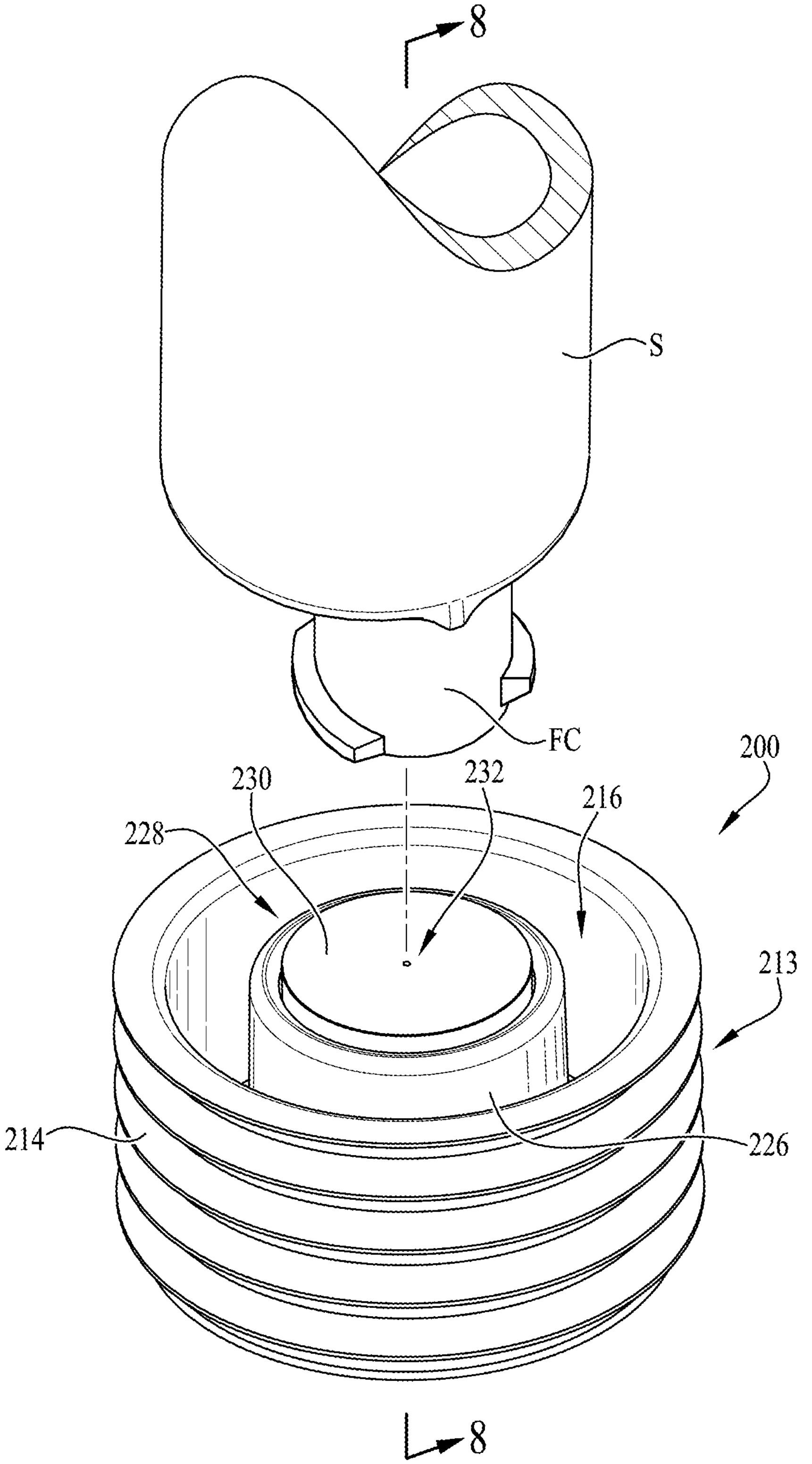
FIG. 7 shows a bottle adapter connector according to another example embodiment of the present invention, showing a silicone sleeve wrapped around the male port for engagement with the end coupling of the syringe.
Figure 9:
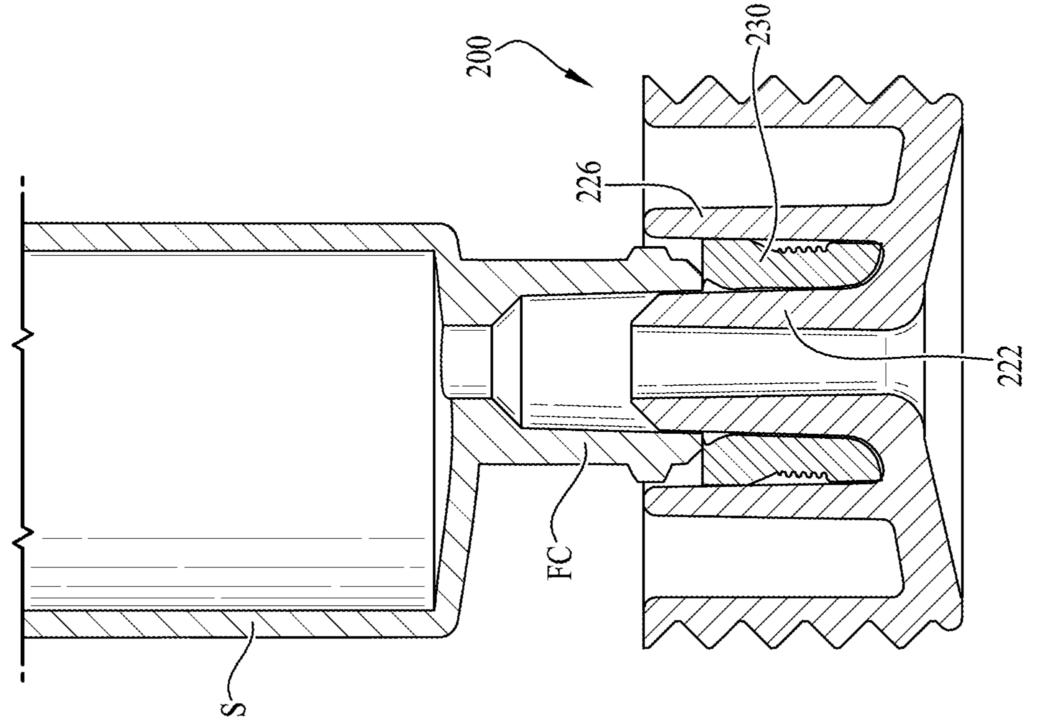
FIG. 9 shows the cross-sectional view of FIG. 8, and showing the end coupling of the syringe engaging the male port such that the silicone sleeve is displaced to permit fluid flow between the syringe end coupling and the male coupling of the bottle adapter connector.
Figure 8:
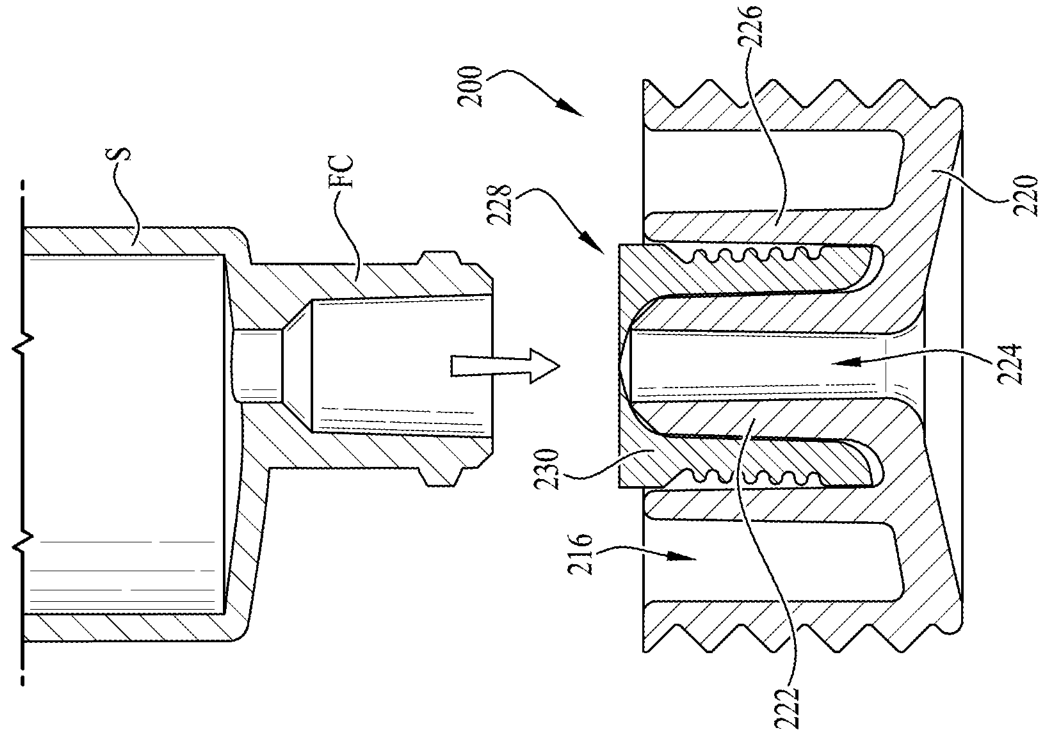
FIG. 8 shows a cross-sectional view of FIG. 7 taken along line 8-8.
Figure 10:
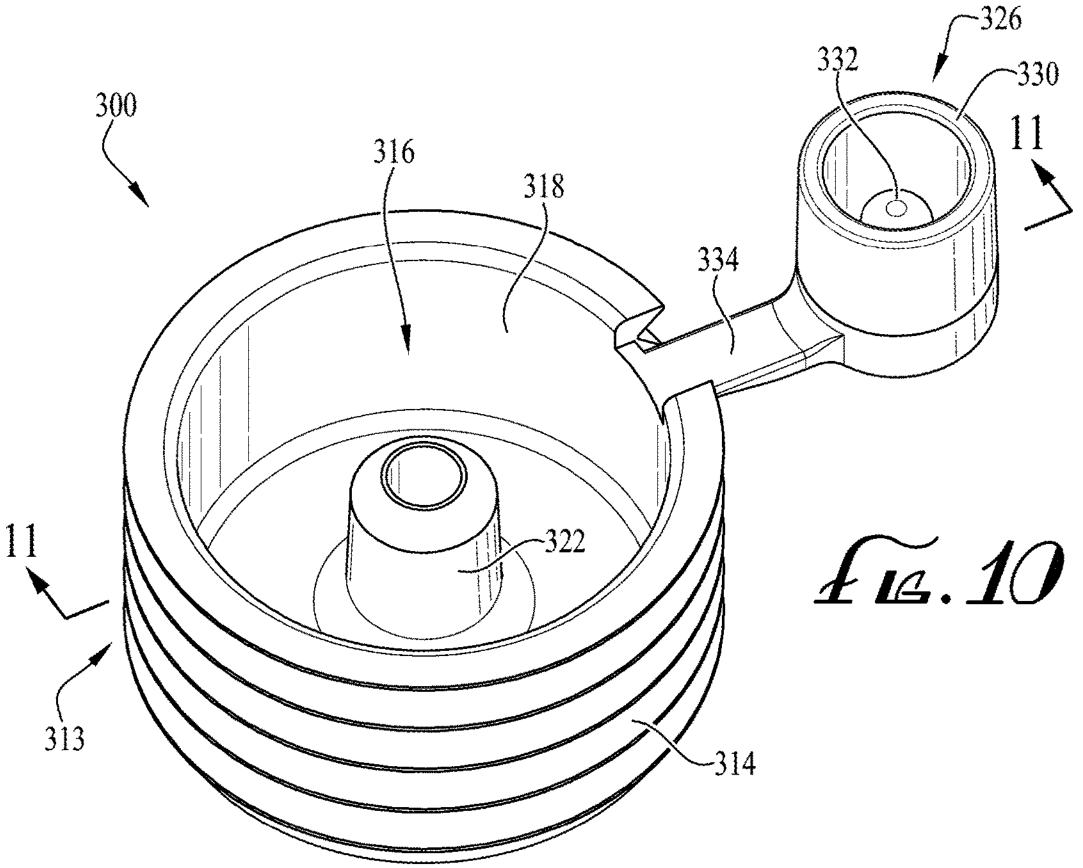
FIG. 10 shows a bottle adapter connector according to another example embodiment of the present invention, and showing the bottle adapter comprising a tethered cap for engagement with a male port of the connector.
Figure 11:
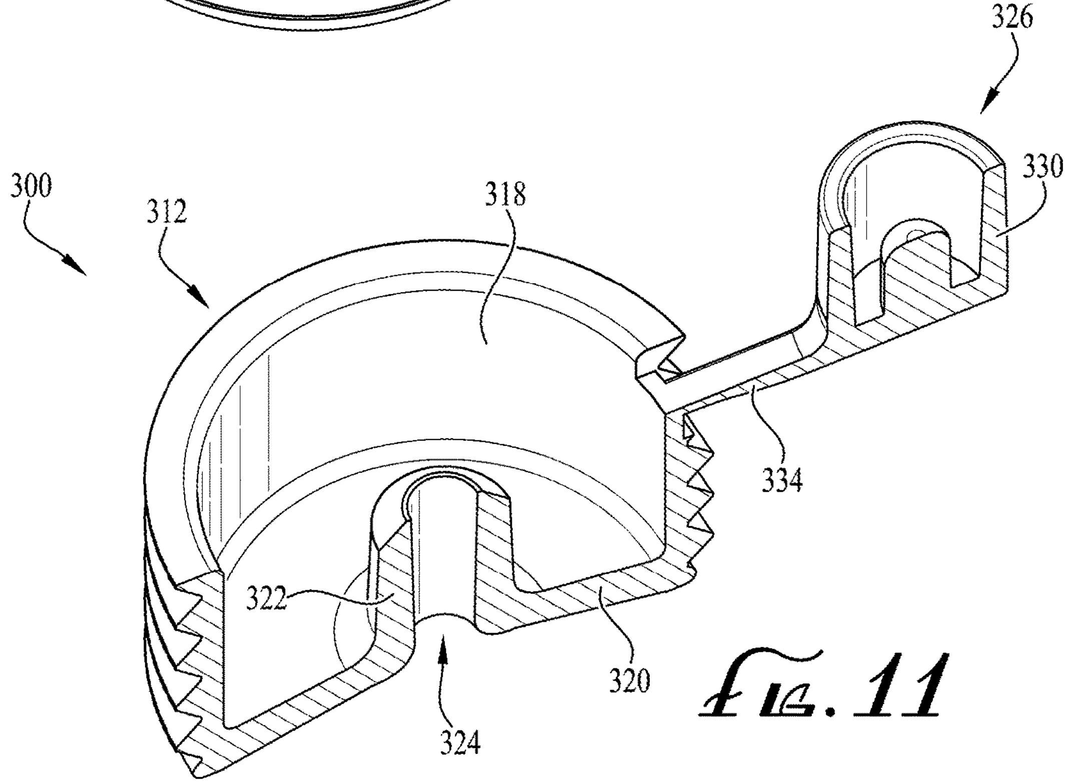
FIG. 11 shows a perspective view of a cross-sectional view of the connector of FIG. 10.
Figure 12:
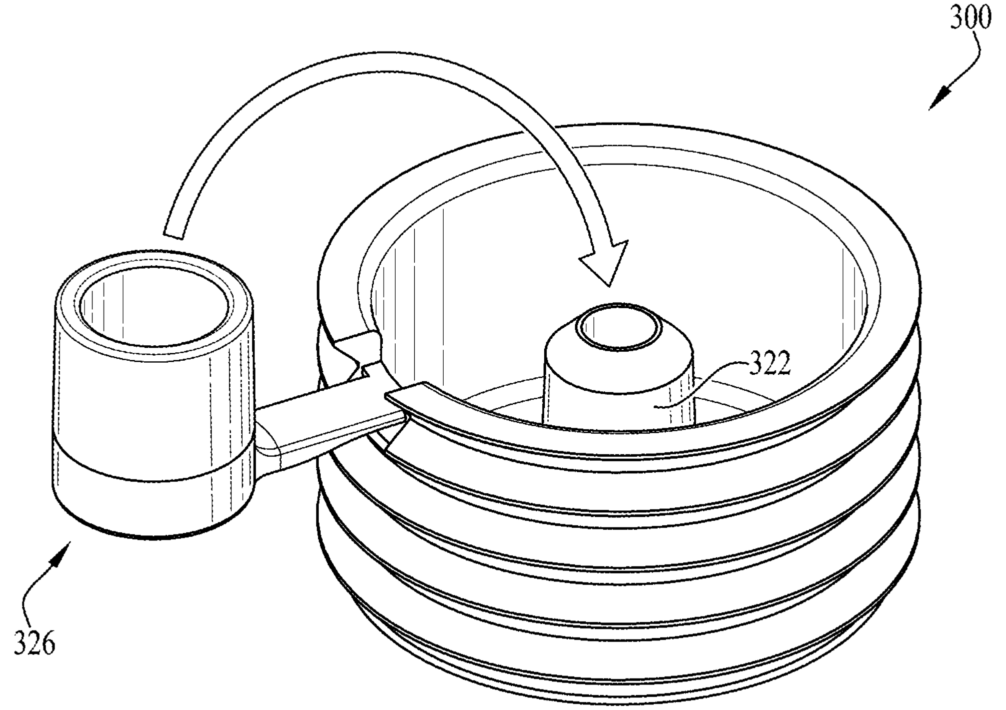
FIGS. 12-13 show a sequence of operation of the bottle adapter connector and tethered cap of FIG. 10, and showing cap being generally hinged to the connector to be moved between an open configuration and a closed or capped configuration.

FIGS. 7-9 show a connector 200 according to another example embodiment of the present invention. In example embodiments, the connector 200 is generally similar to the connectors 10, 100 as described above and comprising a body 12 comprising an outer peripheral surface 213 having a plurality of outer peripheral flanges or steps 214, a recess portion 216 defining a floor surface 220, a male coupling 222 centrally positioned and extending from the floor surface 220, and a central conduit 224 extending entirely through the male coupling 222. In example embodiments, the connector 200 further comprises an outer collar 226 generally centrally positioned and surrounding the male coupling 222. In example embodiments, a sealing mechanism 228 is preferably provided for substantially sealing the conduit 224 of the male coupling 222 from the elements, for example, by fitting itself around the male coupling 222 and within the outer collar 226. In example embodiments, the seal mechanism comprises a substantially resilient grommet or sleeve 230 that is substantially cylindrical with a first open end for receiving the male coupling 222 and whereby the collar is fitted within a recessed portion defined between the outer collar 226 and the male coupling 222. In example embodiments, the sleeve 230 comprises a second open end that is substantially closed except for a substantially small central opening 232, for example, which generally defines an opening sized between about 0.10-1.5 millimeters, for example about 0.50 millimeter according to one example embodiment.

As depicted in FIGS. 8-9, engagement of the end coupling FC of the syringe S with the male coupling 222 causes deformation of the sleeve 230, for example, such that the sleeve 230 is generally deformed and displaced within the recess so that fluid communication is provided between the end coupling FC and the male coupling 222 (e.g., the male coupling is received within the end coupling FC). As shown in FIG. 9, the opening 232 is substantially flexible and elastic so that the entirety of the sleeve 230 passes beyond the end portion of the male coupling 222 to permit communication of the conduit 224 with the end coupling FC. Retraction of the end coupling FC preferably causes the sleeve 230 to expand back to its neutral state such that the sleeve substantially seals the conduit 224 from the elements. In example embodiments, the sleeve 230 is formed from silicone or other resilient and substantially deformable materials (or combinations thereof). Accordingly, when the connector 200 is fitted within a bottle opening, the sleeve 230 preferably substantially seals the conduit 224 of the male coupling 222 such that the fluid or medicine within the bottle is not exposed to the elements. And when it is desired to transfer fluids between the bottle and the syringe S, without any additional steps of removing a closure or other seal, the end coupling FC is pressed atop the sleeve 230 such that the sleeve 230 deforms to retract therein to expose the male coupling 222 for engaging the end coupling FC. Furthermore, when a cap L is coupled to the opening of the bottle with the connector 200 fitted therein, a portion of the cap (e.g., internal surface) can engage with the sleeve 230 to apply a force thereon.

FIGS. 10-13 show a connector 300 according to another example embodiment of the present invention. In example embodiments, the connector 300 is generally similar to the connectors 10, 100, 200 as described above and comprising a body 312 comprising an outer peripheral surface 313 having a plurality of outer peripheral flanges or steps 314, a recess portion 316 defining a floor 320, a male coupling 322 centrally positioned and extending from the floor 320, and a central conduit 324 extending entirely through the male coupling 222. According to example embodiments, the connector comprises a cap or closure 326 that is hingedly mounted to a portion of the connector 300 for pivoting between an open configuration (see FIG. 12) and a closed configuration (see FIG. 13). In example embodiments, the closure 326 comprises an outer collar 330, a central plug 322, and a tether 334 connecting the closure 326 to a portion of the connector 300. In example embodiment, the tether 334 integrally couples the closure 326 to the connector 300. Optionally, the tether can be removably coupled to the connector 300.

Figure 13:
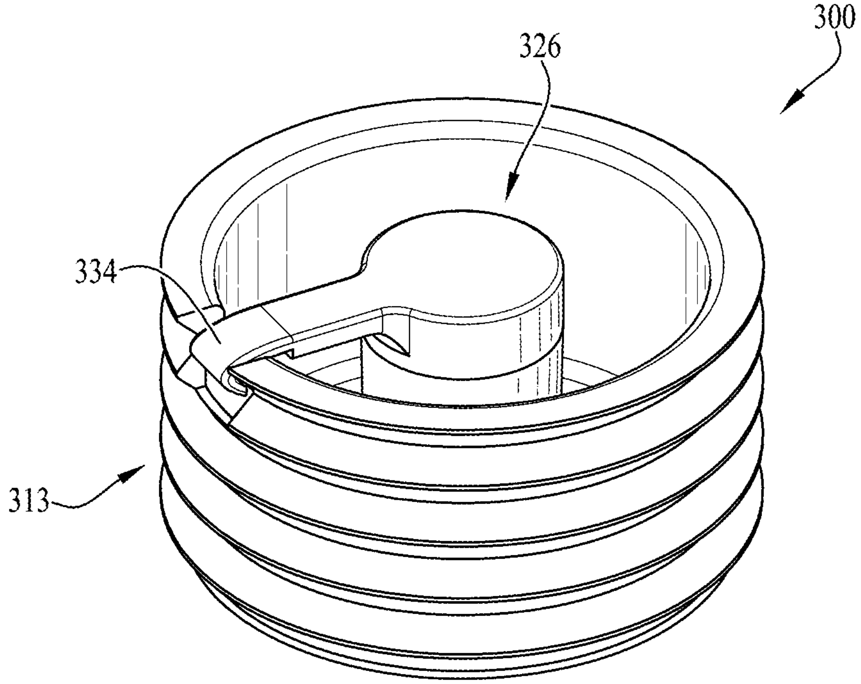

In example embodiments, the tether 334 extends outwardly from an upper portion of the body 12 near the outer peripheral flanges 314. Preferably, the tether 334 comprises a living hinge such that the closure 326 coupled thereto is pivotable between the open and closed configurations. In example embodiments, the living hinge is substantially flexible and resilient to permit the closure 326 to pivot at least about 180 degrees. In example embodiments, the male coupling 322 is substantially shorter than the male couplings as described above, for example, such that a cap L can be fitted and coupled to the bottle with the closure 326 in the closed configuration and sealed with the male coupling 322. Thus, according to one example embodiment of the present invention, the closure 326, when sealingly engaged with the male coupling 322 and in the closed configuration (e.g., with the central plug 332 fitted within the conduit 324 and the collar 330 surrounding the male coupling 322), is generally at least about flush with the upper portion of the outer collar body, for example, to allow coupling engagement of the cap L with the bottle. As depicted in FIG. 13, the tether 334 (and hinge thereof) is generally configured to be about concentric with the outermost surfaces of the flanges 314. Optionally, the tether and hinge can be sized as desired, for example, wherein in the closed position the hinge remains inwardly offset from the outermost surfaces of the flanges and does not engage with a surface of the bottle opening when engaged therewith.

Figure 14:
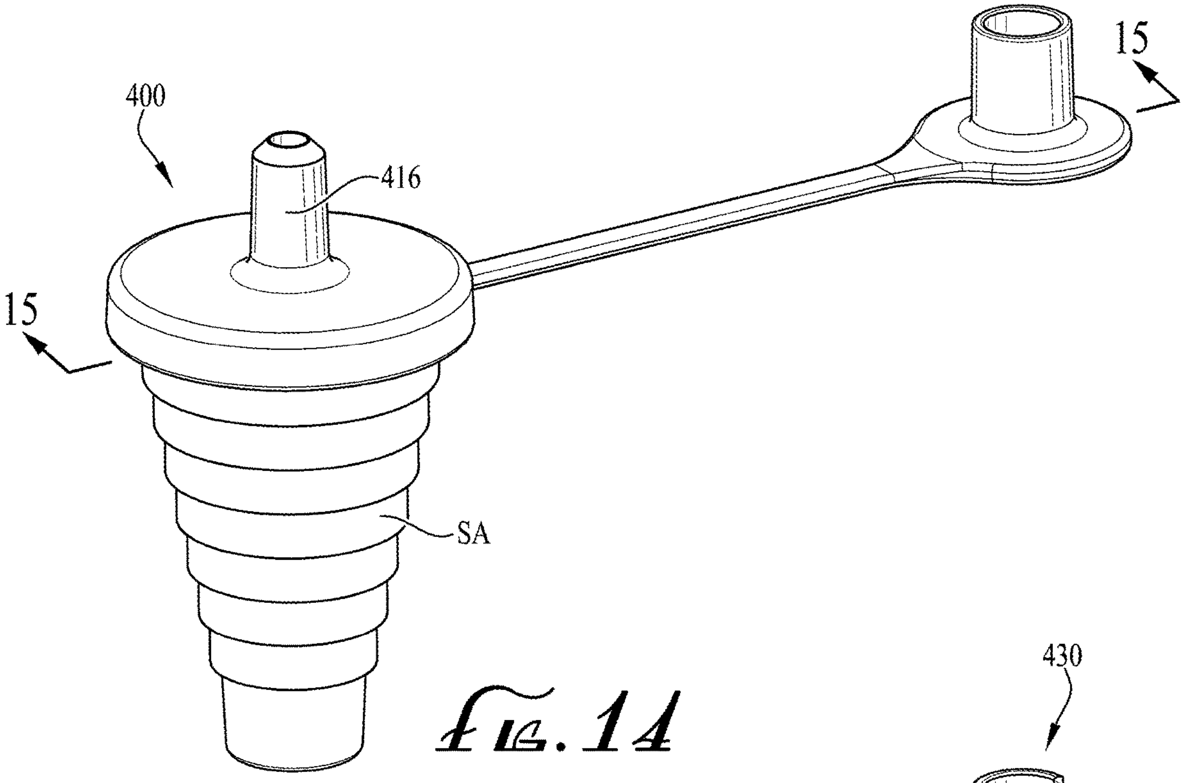
FIG. 14 shows a perspective view of a bottle adapter transfer connector according to another example embodiment of the present invention, and showing a bottle adapter connector engaged with a portion of the bottle adapter transfer connector.
Figure 15:
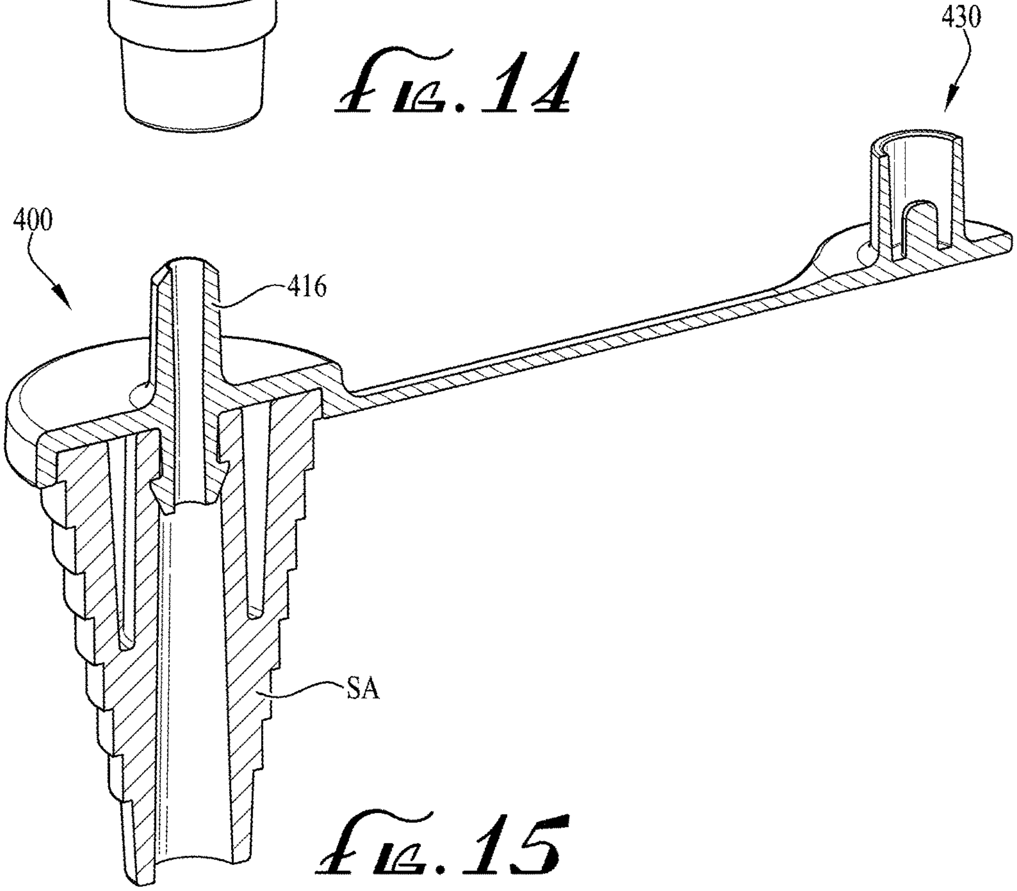
FIG. 15 shows a perspective cross-sectional view of the bottle adapter transfer connector coupled to a portion of the bottle adapter connector shown in FIG. 14.
Figure 10:
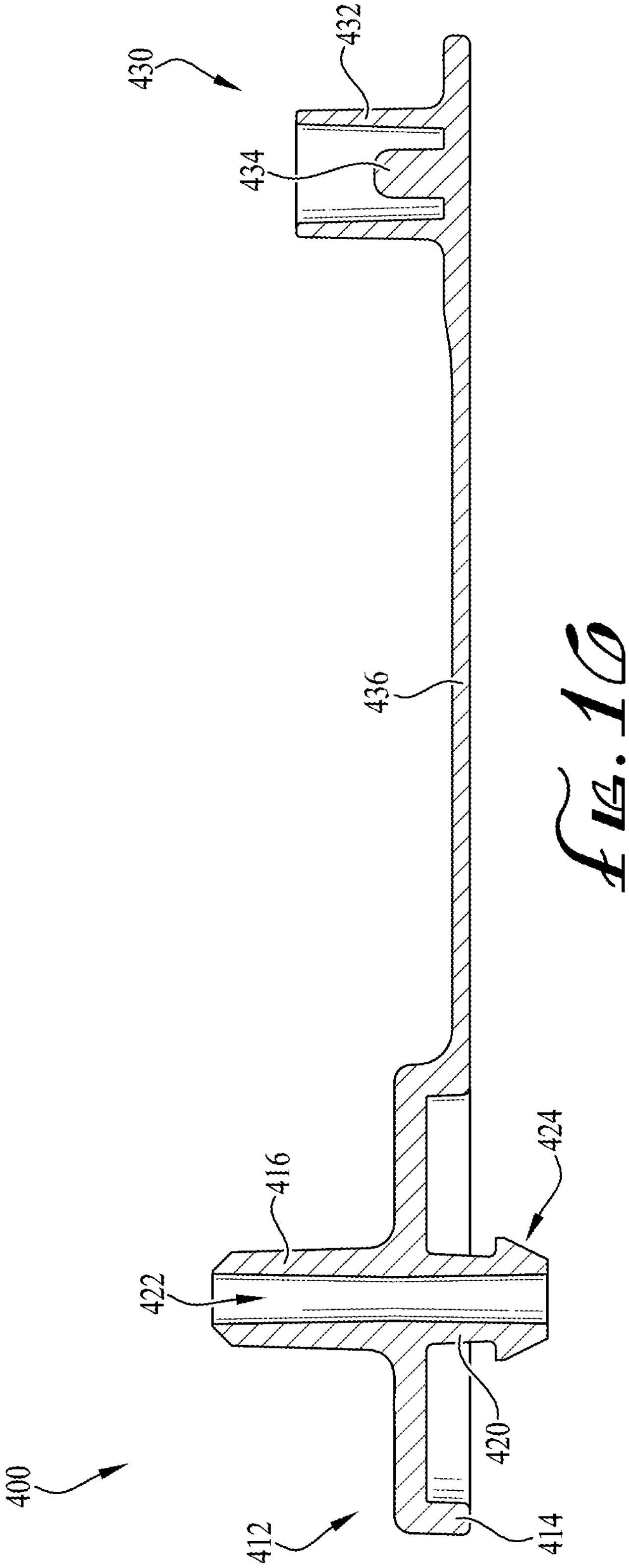

FIGS. 14-16 show a bottle adapter transfer connector 400 according to another example embodiment of the present invention. In example embodiments, the connector 400 provides for the transfer of fluids between a syringe Sand a medicine bottle, for example wherein a stepped adapter SA is configured for engagement with the opening of the bottle and wherein the connector 400 removably couples to the connector 400 and facilitates the coupling engagement of the end connector FC of the syringe S therewith. In example embodiments, the connector 400 comprises a cylindrical cap 412, a collar 414 generally extending perpendicularly from the cap 412, a male coupling 416 centrally-positioned and extending from the cap 412 in a first direction, and an engagement port 420 axially aligned with the male coupling 416 and extending in the second direction. In example embodiments, a conduit extends entirely through the male coupling and engagement port, for example, such that fluids are permitted to flow therethrough. In example embodiments, the engagement port 420 comprises a barbed feature 424, which preferably provides a surface feature capable of engagement with a port or conduit of the stepped adapter SA (see FIG. 15). In example embodiments, the collar 414 is preferably sized and shaped to be fitted around an upper outer periphery portion of the stepped adapter SA In example embodiments, the male coupling 416 comprises a male ENFIT compatible coupling. In example embodiments, the engagement port 420 is preferably sized to provide sufficient frictional engagement with the conduit of the stepped adapter SA In example embodiments, the conduit of the stepped adapter SA is generally sized to be compatible with a male enteral-only coupling.

In example embodiments, a closure 430 can be provided for sealing the conduit 422 from the elements. In example embodiments, the closure 430 comprises an outer collar member 432, a central plug configured for frictional engagement with the conduit 422. In example embodiments, the closure 430 can be tethered to the connector 400, for example wherein tether 436 is generally flexible and resilient to allow for positioning the closure 430 in either of the open or closed configurations.

Figure 17:
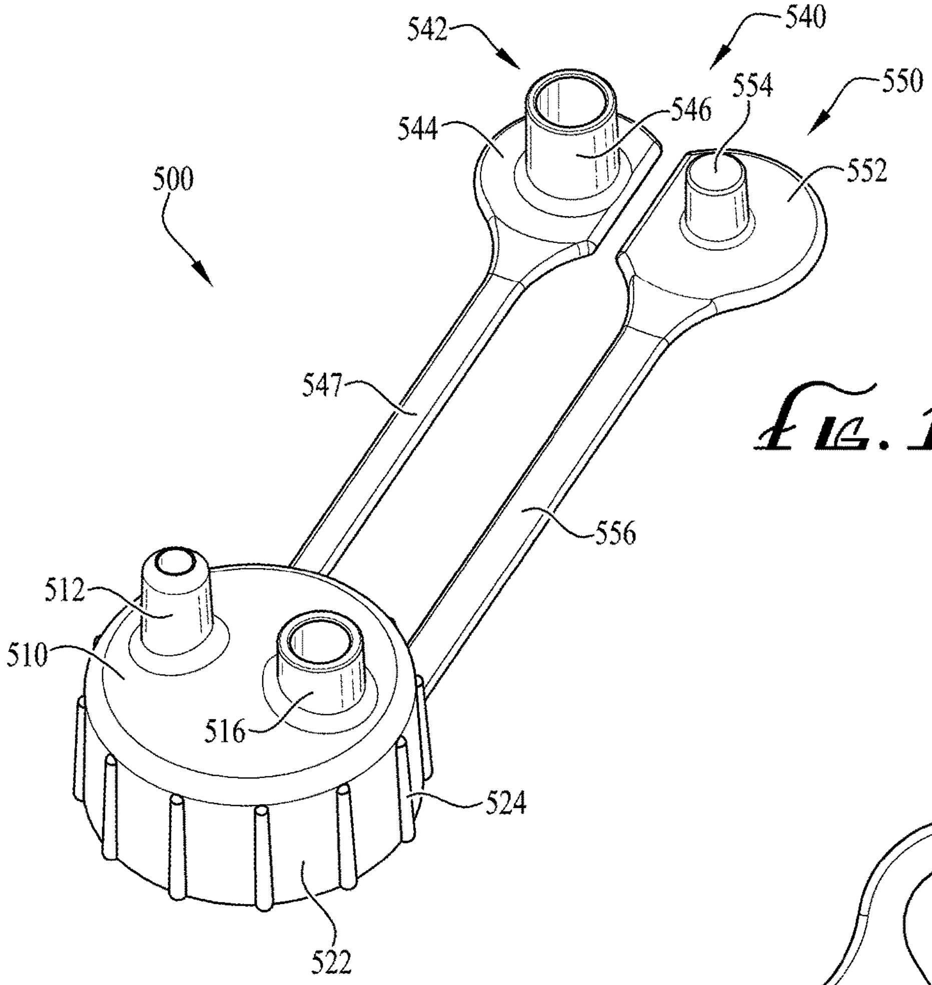
FIG. 17 shows a perspective view of a fluid transfer lid according to another example embodiment of the present invention.
Figure 18:
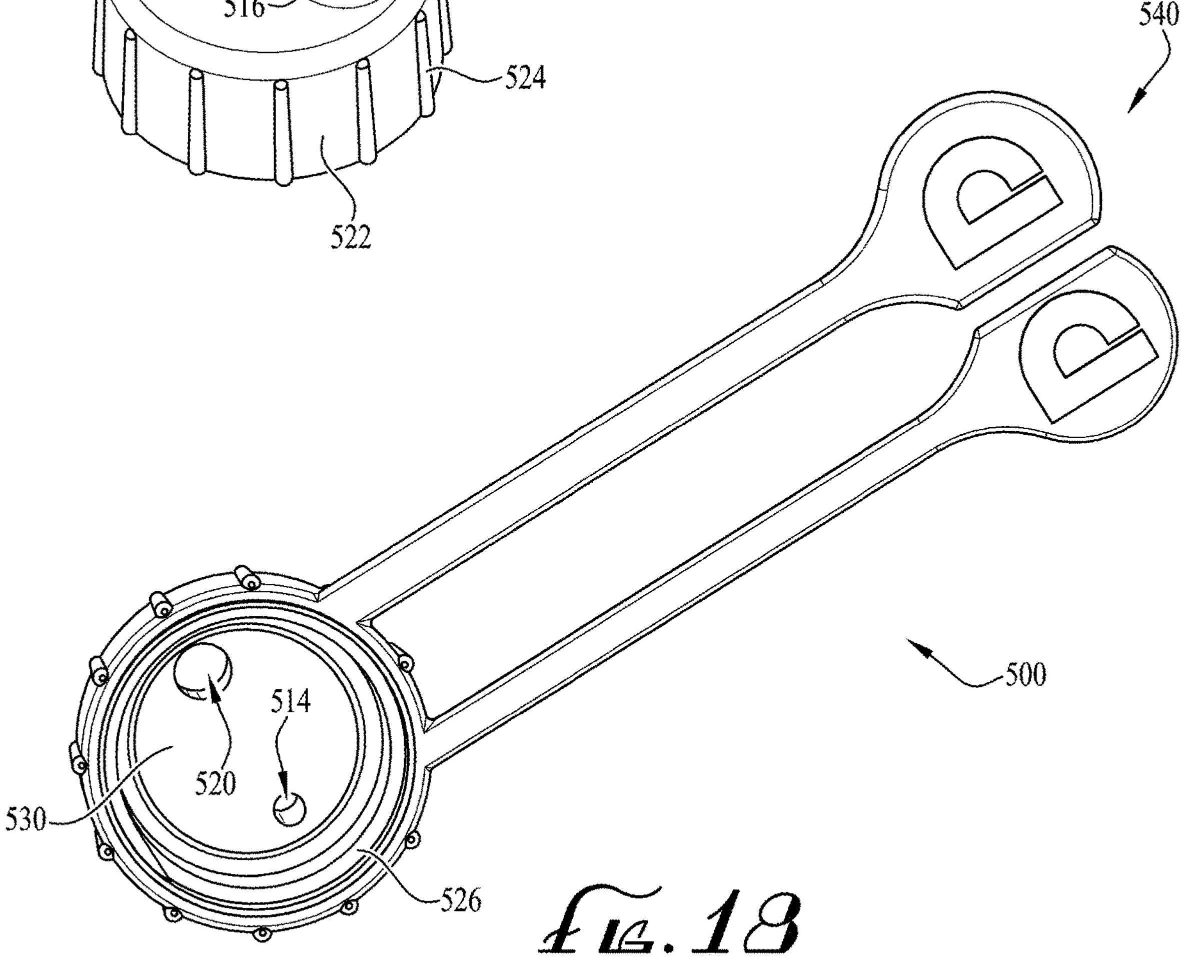
FIG. 18 shows a rear perspective view of the fluid transfer lid of FIG. 17.

FIGS. 17-18 show a transfer lid 500 according to another example embodiment of the present invention. In example embodiments, the transfer lid 500 is configured to be removably mounted to a bottle or container such that fluids or medicine contained within the container can be withdrawn or transferred therefrom and into a syringe S. Preferably, the transfer lid 500 is compatible with multiple fittings or couplings, for example, both enteral-only connectors and ENFIT compatible connectors. In example embodiments, the transfer lid 500 comprises a generally circular top panel 510 with first and second transfer ports 512, 516 extending from the top panel 510 outwardly in a first or distal direction. In example embodiments, the first transfer port 512 comprises a conduit 514 and the second transfer port 516 comprises a conduit 520. In example embodiments, the first transfer port 512 comprises a male ENFIT compatible connector and the second transfer port 516 comprises an enteral-only connector.

An attachment collar 522 extends in a second or proximal direction from the top panel 510, and an internal circumferential face thereof is threaded to releasably engage corresponding threads at the top of the containment shell of the container. An exterior circumferential face of the attachment collar 522 of the transfer lid 500 optionally comprises spaced intentions, ridges, recesses, or other gripping features 524 to assist a user in installing and removing the transfer lid 500 onto and from the containment shell of the container. Optionally, closures 540 are provided for sealing with the first and second transfer ports 512, 516. In example embodiments, one of the closures 540 (e.g., for sealing with the first transfer port 512) comprises a first closure 542 comprising a flange or lip 544, a plug (unshown), an outer collar or lip 546, and a tether 547. Similarly, a second closure 550 is provided for sealingly engaging the second transfer port 516. In example embodiments, the second closure 550 comprises a flange or lip 552, a plug 554 and a tether 556. In example embodiments, the closures 540 can be used independently of each other, for example such that one of them can be in the closed position and engaged with one of the transfer ports while the other one is in the open position and an end connector of a syringe is removably mounted to the other of the transfer ports.

Figure 19:
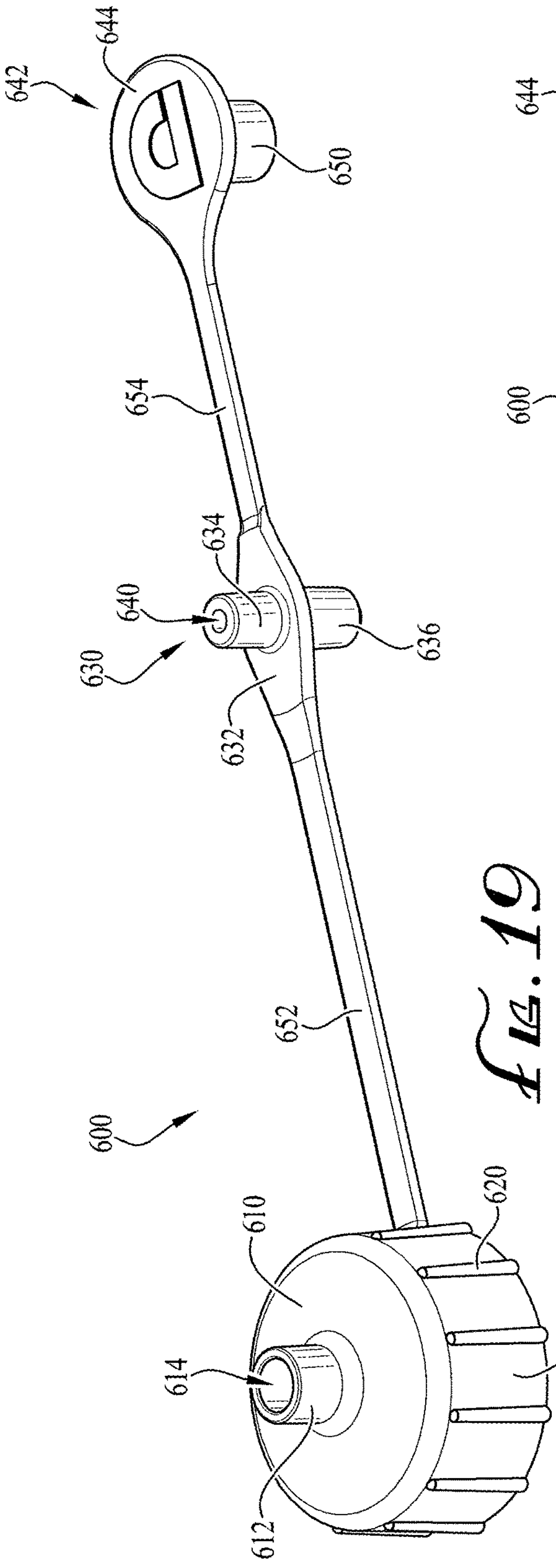
FIG. 19 shows a perspective view of a fluid transfer lid according to another example embodiment of the present invention.
Figure 20:
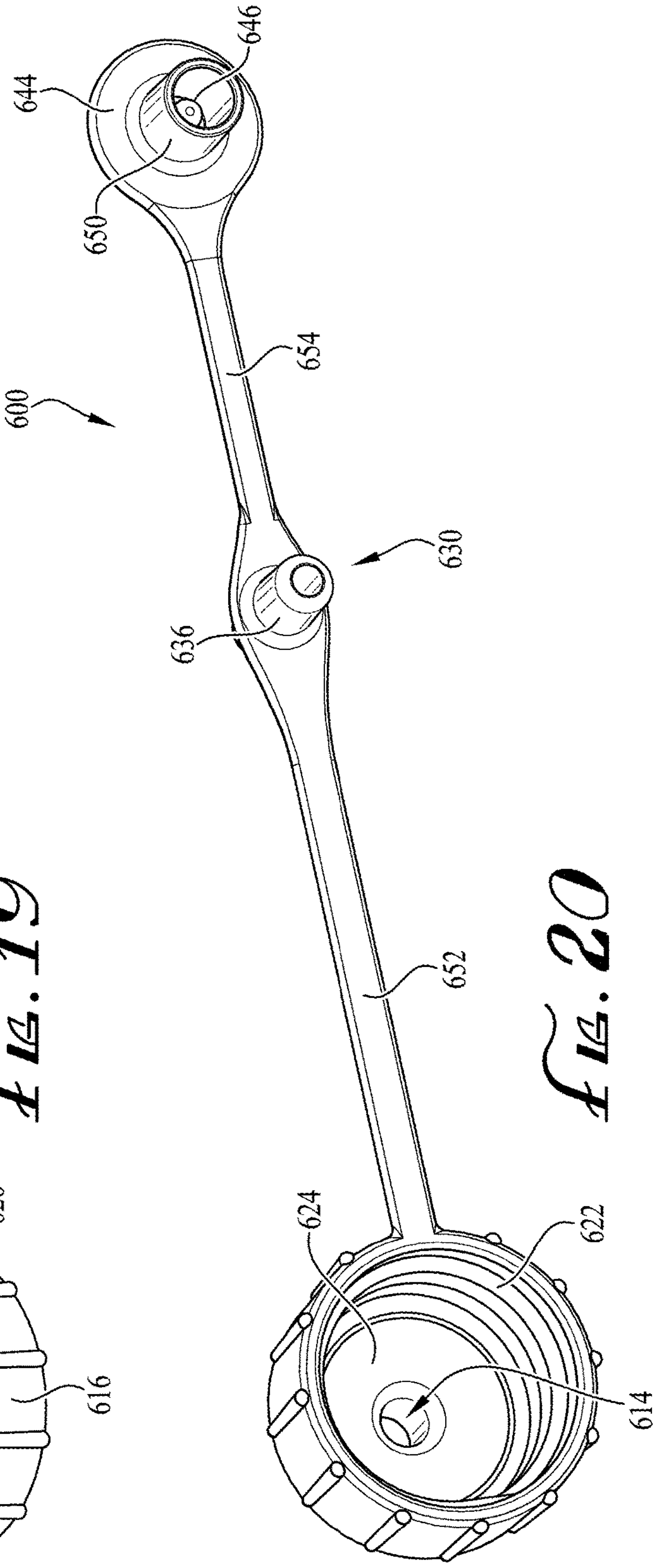
FIG. 20 shows a rear perspective view of the fluid transfer lid of FIG. 19.

FIGS. 19-20 show a transfer lid 600 according to another example embodiment of the present invention. In example embodiments, the transfer lid 600 is similarly configured to be removably mounted to a bottle or container such that fluids or medicine contained within the container can be withdrawn or transferred therefrom and into a syringe S. Preferably, the transfer lid 500 is compatible with multiple fittings or couplings, for example, both enteral-only connectors and ENFIT compatible connectors. In example embodiments, the transfer lid 600 comprises a generally circular top panel 610 with a transfer port 612 extending from the top panel 610 outwardly in a first or distal direction. In example embodiments, the transfer port 612 comprises a conduit 614 extending entirely through the transfer port 612. In example embodiments, the transfer port 612 comprises an enteral-only connector, for example a female enteral-only connector according to one example embodiment. An attachment collar 616 extends in a second or proximal direction from the top panel 610, and an internal circumferential face thereof is threaded to releasably engage corresponding threads at the top of the containment shell of the container or bottle. An exterior circumferential face of the attachment collar 616 of the transfer lid 600 optionally comprises spaced intentions, ridges, recesses, or other gripping features 620 to assist a user in installing and removing the transfer lid 600 onto and from the containment shell of the container.

In example embodiments, an adapter 630 and a closure 642 can be provided with the transfer lid 600. For example, according to example embodiments, the adapter 630 comprises a central flange member 632, a first connector 634, a second connector 636, and a conduit 640 extending entirely through the connectors 634, 636. The closure 642 comprises a flange or lip 644, a plug 646, and an outer collar or lip 650. In example embodiments, a tether generally connects the adapter 630 and closure 642 with the transfer lid 600. For example, according to one example embodiment, a first tether 652 is provided for connecting the transfer lid 600 with the adapter 630, and a second tether 654 is provided for connecting the adapter 630 with the closure 642. In use, the transfer lid 600 can be fastened to a bottle for facilitating the transfer of fluids between the bottle and the syringe. If the syringe comprises a male enteral-only end coupling, the transfer port 612 can be utilized to facilitate the transfer of fluids therebetween. If the syringe S comprises a ENFIT compatible coupling, the adapter 630 is connected with the transfer port 612, for example, such that the first connector 634 is coupled with the transfer port 612 and the second connector 636 is coupled with the ENFIT compatible coupling of the syringe.

Accordingly, by the tethered adapter 630, the transfer lid 600 accommodates both enteral-only and ENFIT compatible connectors. Accordingly, according to one example embodiment, the present invention relates to a transfer lid comprising a female enteral only coupling, and comprising an adapter tethered thereto such that the lid can accommodate both enteral-only and ENFIT compatible connectors. As such, the transfer lids 500, 600 preferably provide multiple couplings such that connectors or syringes having either enteral-only or ENFIT compatible couplings can be fitted therewith to facilitate the transfer of fluids between the bottle and syringe.

FIGS. 21-25 show a fluid transfer adapter 700 according to another example embodiment of the present invention. As depicted, the adapter 700 comprises a flange or disc-shaped body 710 comprising a first end 712 and a second end 714. The disc-shaped body 710 comprises a first surface 720 defining a first coupling 722 and a second surface 724 comprising a second coupling 726. A conduit 730 extends entirely through the couplings 722, 726 from the first end 712 to the second end 714. In example embodiments, the first coupling 722 is generally centrally-positioned on the body and extends towards the first end 712, and the second coupling 726 is generally axially aligned with the first coupling 722 and extends towards the second end 714. In example embodiments, the first coupling 722 comprises a male ENFIT compatible coupling and the second coupling 726 comprises a male enteral-only coupling.

Figure 21:
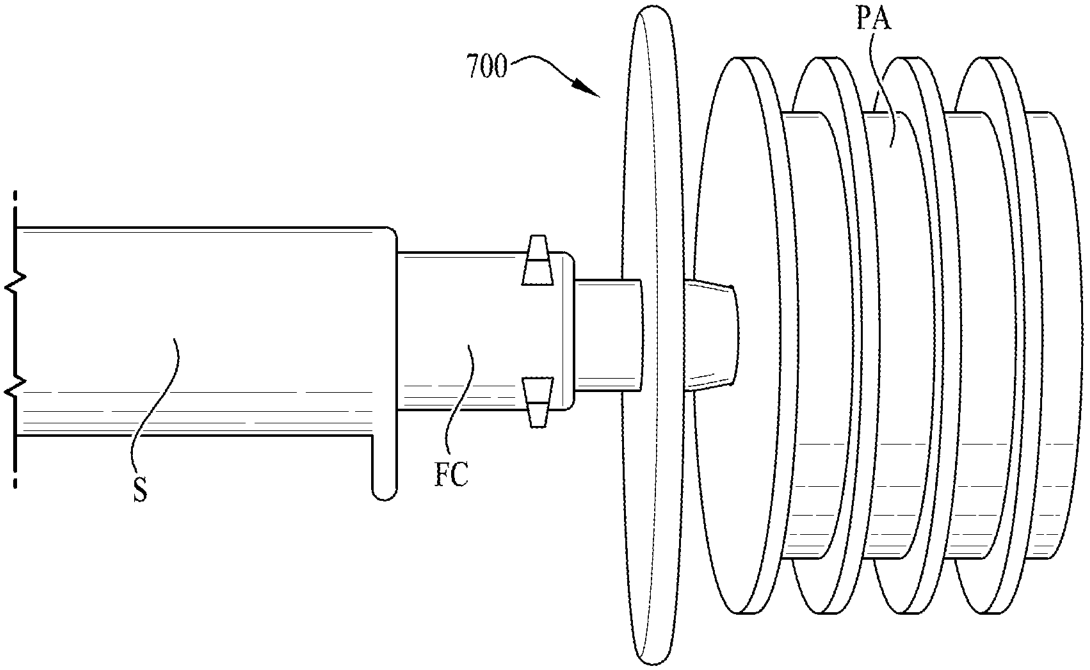
FIGS. 21-22 show a fluid transfer adapter according to another example embodiment of the present invention, the fluid transfer adapter being compatible for removable engagement with both a conventional enteral-only ported press-in bottle adapter and an enteral-only stepped bottle adapter.
Figure 22:
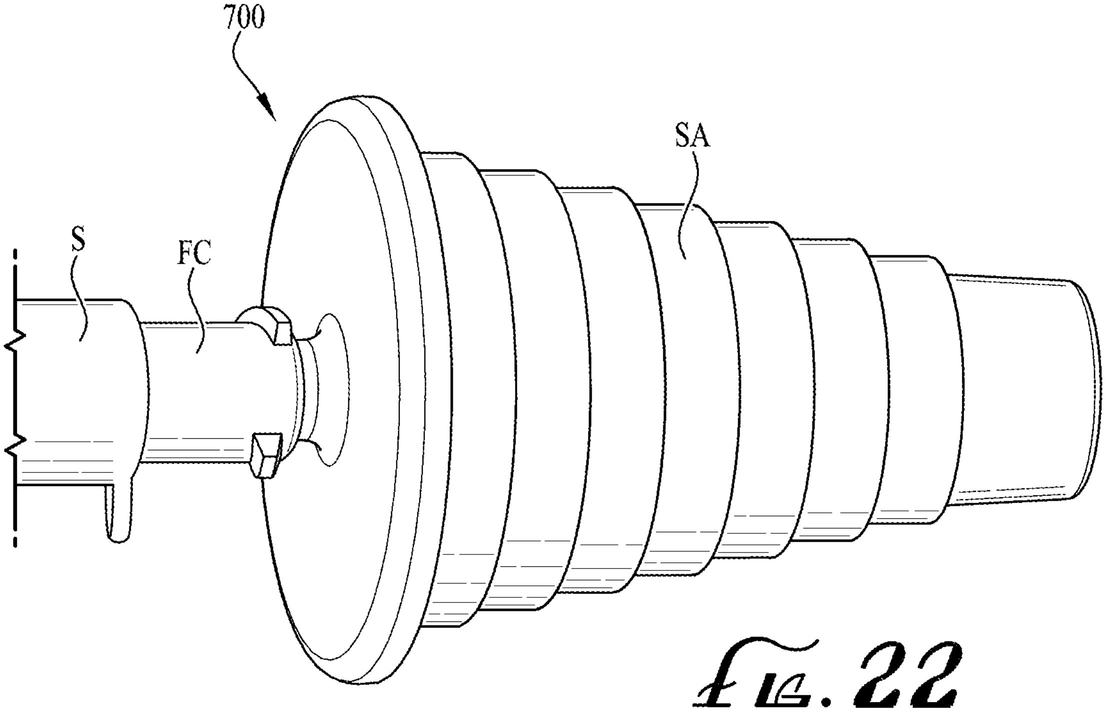
Figure 23:
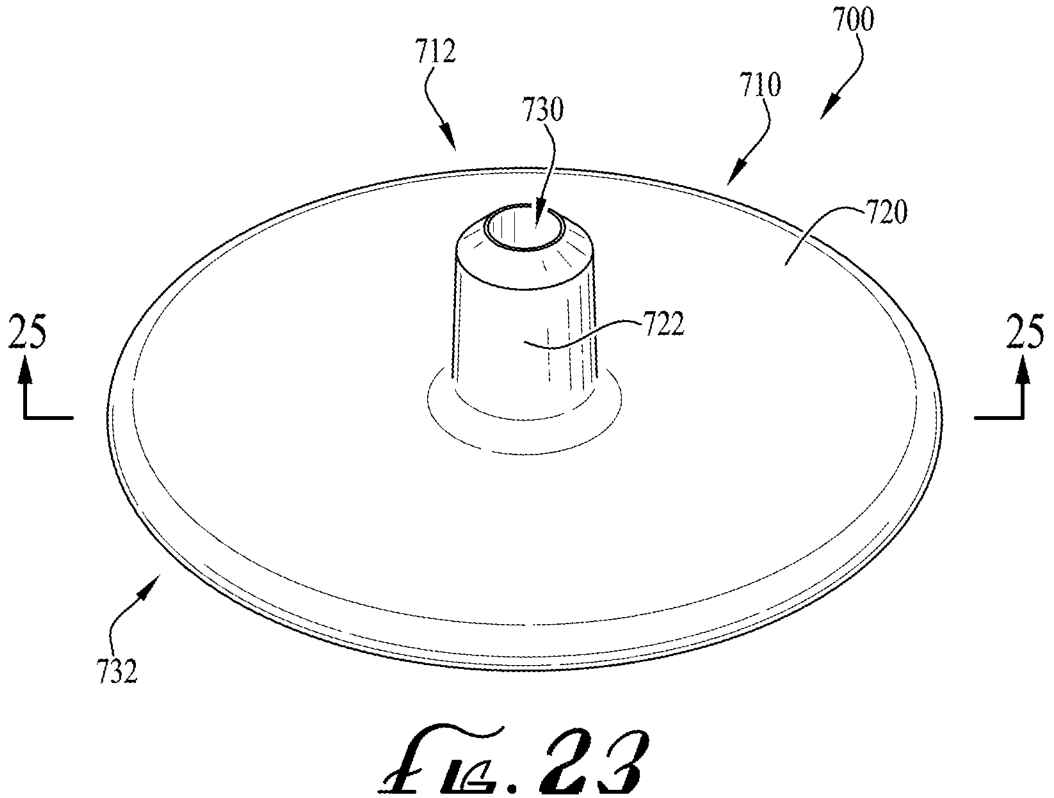
FIG. 23 shows a perspective view of a first side of the fluid transfer adapter of FIGS. 21-22.
Figure 24:
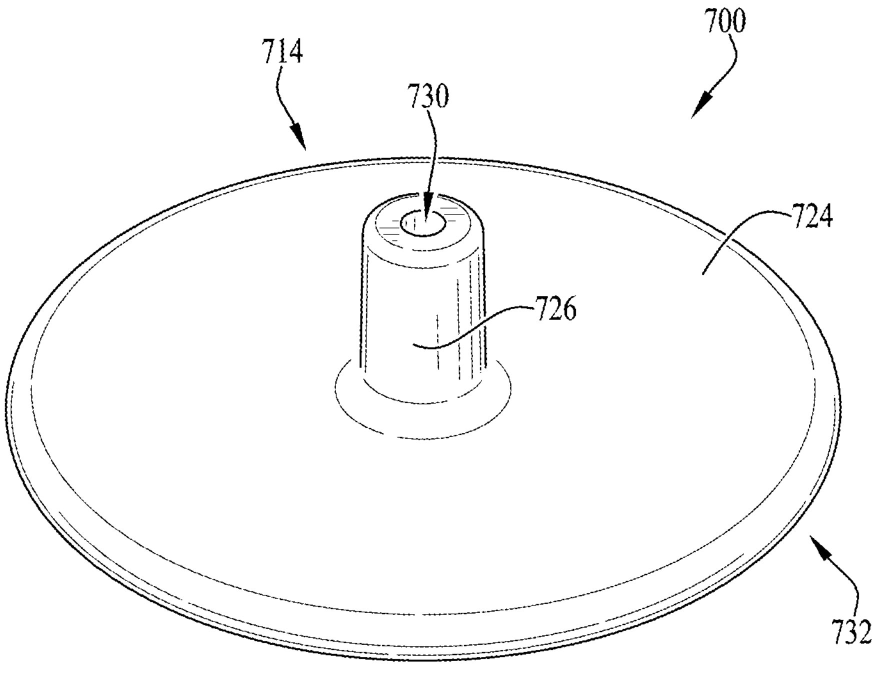
FIG. 24 shows a second side of the fluid transfer adapter of FIG. 23.

As shown in FIGS. 21-22, the adapter 700 can preferably be used with both conventional "press-in" and stepped bottle adapters PA, SA For example, as conventional bottle adapters generally comprise an enteral-only fitting, the second coupling 726 is configured for engagement with the enteral-only fitting of the bottle adapters PA, SA, while the first coupling 722 is a male ENFIT compatible coupling configured for providing engagement with an ENFIT compatible coupling, for example, a female ENFIT compatible coupling FC of a syringe S. In example forms, the male ENFIT compatible connector can be configured for a slip/friction fit connection, or can comprise one or more coupling elements for permanent/removable engagement with a portion of the female ENFIT compatible connector of the syringe, for example, one or more ribs or threads of the female ENFIT compatible connector. In alternate example embodiments, the male ENFIT compatible connector can comprise other coupling or engagement features, for example, one or more flexible clips or other couplings such that permanent or removable engagement can be provided between the male ENFIT connector and the female ENFIT connector of the syringe.

In example embodiments, the disc-shaped body 710 is preferably sized and configured to prevent the fluid transfer adapter or any portions thereof from presenting a choking hazard, for example for young children. In example embodiments, the fluid transfer adapter including the flange has a minimum dimension of at least about 2.25 inches by at least about 1.25 inches, or is otherwise sized and configured to prevent the fluid transfer adapter from passing through a 2.25 inches×1.25 inches choke test cylinder in compliance with 37 C.F.R. 1501.4. According to one example embodiment, the flange comprises a circular disc having a diameter D2 of at least about 2.25 inches, for example 2% inches or 3 inches. In alternate embodiments, the flange may have a square, rectangular, polygonal, elliptical or otherwise shaped configuration, and/or may be larger or smaller than the above specified dimensions, for example 1% inches, 4 inches, etc. Optionally, one or more openings can be formed within one or more portions of the body as desired. In example embodiments, at least a portion of the body is shaped to provide a gripping surface or feature to facilitate the gripping thereof, for example, when connecting the adapter with the bottle adapter and the syringe, or for example, when it is desired to disengage the adapter from either of the syringe or the bottle adapter. According to another example embodiment of the present invention, the male ENFIT compatible connector of the adapter is replaced with a female ENFIT compatible connector, for example, such that a syringe comprising a male ENFIT compatible connector can be connected to the pharmacy bottle adapter.

Figure 25:
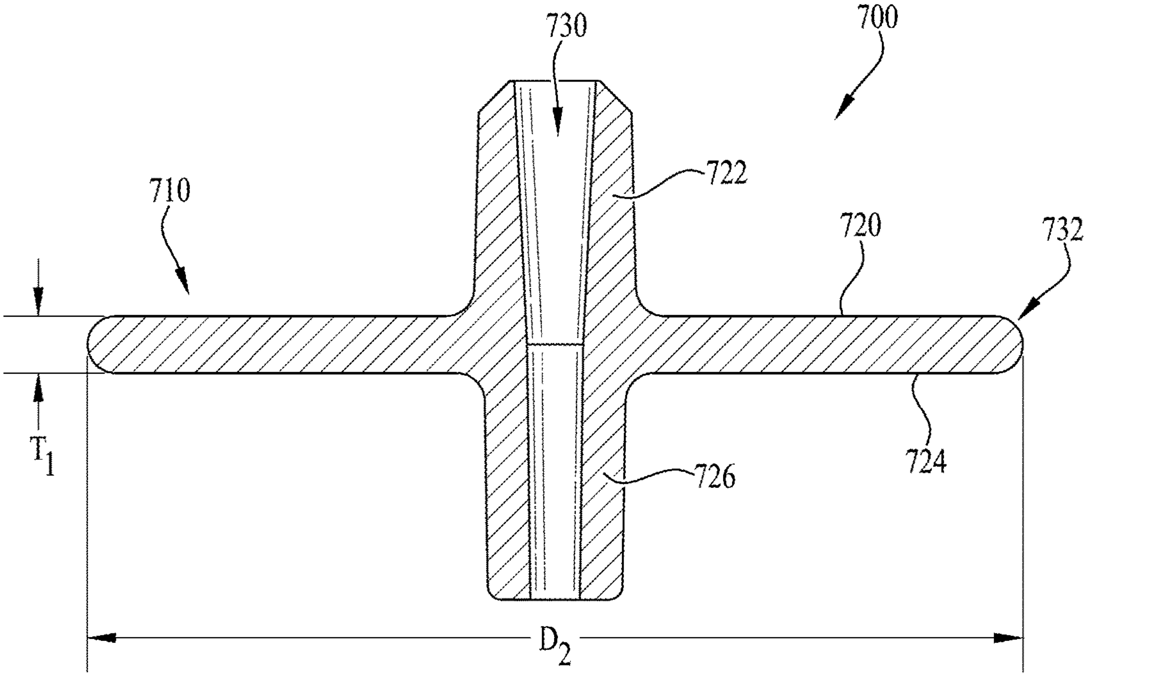
FIG. 25 shows a cross-sectional view of the fluid transfer adapter of FIG. 23 taken along line 25-25.

As shown in FIG. 25, the disc-shaped body 710 is substantially uniform and comprises a substantially radiused outer periphery, for example, wherein a generally uniform radiused edge is defined between the upper and lower surfaces of the disc-shaped body, and wherein a substantially smooth transition is provided between the surfaces 720, 724. According to one example embodiment, the outer diameter D2 of the body 710 is at least about 2.25 inches, and a thickness $T_1$ that is defined between the upper and lower surfaces 720, 724 is between about 1-10 millimeters, for example between about 2-8 millimeters according to some example embodiments. In the particular depicted embodiment, the thickness T1 is about 2 millimeters. As described below, the thickness, at least of the outer periphery portion of the adapter can be more or less than 2 millimeters as desired.

Figure 26:
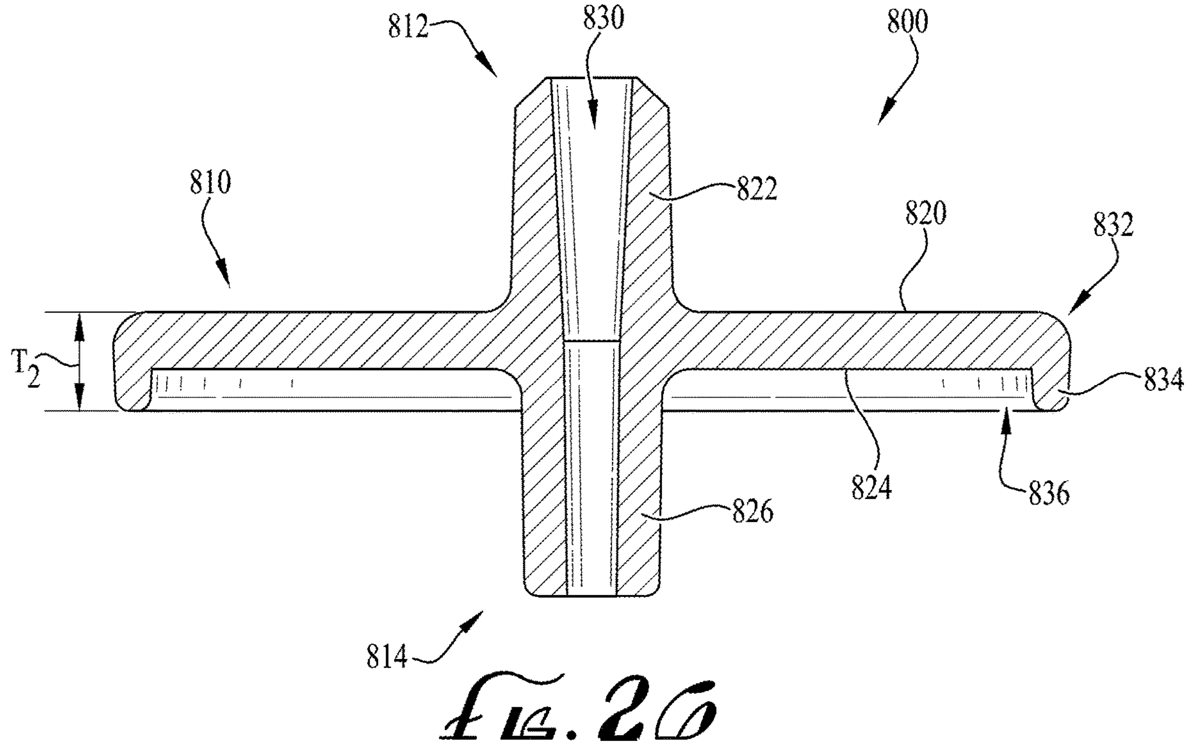
FIG. 26 shows a cross-sectional view of a fluid transfer adapter according to another example embodiment of the present invention.
Figure 27:
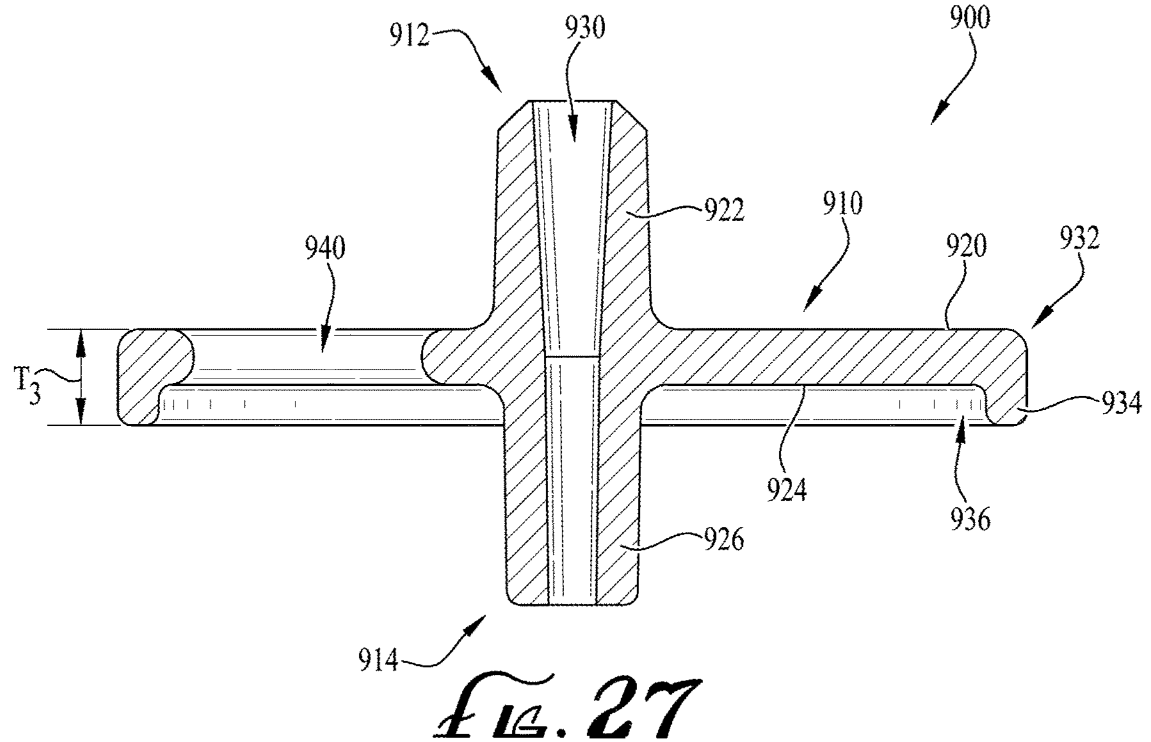
FIG. 27 shows a cross-sectional view of a fluid transfer adapter according to another example embodiment of the present invention.

FIGS. 26-29 show a plurality of fluid transfer adapters 800, 900, 1000, 1100 according to additional example embodiments of the present invention. In example embodiments, the outer periphery of each of the adapters 800, 900, 1000 and 1100 has been modified with respect to the substantially radiused outer periphery 732 of the adapter 700. As depicted in FIG. 26, the radiused outer periphery 832 further includes an outer rim extension 834 extending towards the second end 814, and thereby defining a recess 836 therein. In example embodiments, the thickness T2 is between about 3-5 millimeters. According to one example form, the recess 836 is sized for receiving the large coupling end of the stepped connector (see FIG. 22). FIG. 27 shows a similar adapter 900, for example, comprising an outer rim extension 934 and a recess 936. According to one example embodiment, one or more openings 940 can be formed through the body 910. The thickness T3 is between about 2-5 millimeters. According to one example embodiment, the openings are generally cylindrical. Optionally, the openings can be spaced along a radial and/or linear array, and can be sized and shaped as desired.

According to one example embodiment, a circular array of five generally cylindrical openings extend entirely through the body. In example embodiments, the openings are substantially uniform (e.g., generally the same size and equally spaced apart), and an edge defining each opening is radiused to provide a smooth transition between the surfaces of the body. According to another example embodiment, the body can define a plurality of openings, for example, an outer and inner array of circular openings. According to example embodiments, the outer array comprises about twelve openings and the inner array comprises about twelve openings. In example embodiments, the openings of the outer and inner array are both generally circular in shape, and wherein the openings of the outer array are substantially larger than the openings of the inner array. In alternate embodiments, the disc-shaped body can comprise a matrix of openings formed through at least a portion of the disc-shaped body. For example, the disc-shaped body can comprise a matrix of square openings formed through the body. Optionally, the openings can be shaped as desired. According to example embodiments of the present invention, the openings provide for an enhanced gripping surface, for example, such that the body can be easily grasped by a user and manipulated.

Figure 28:
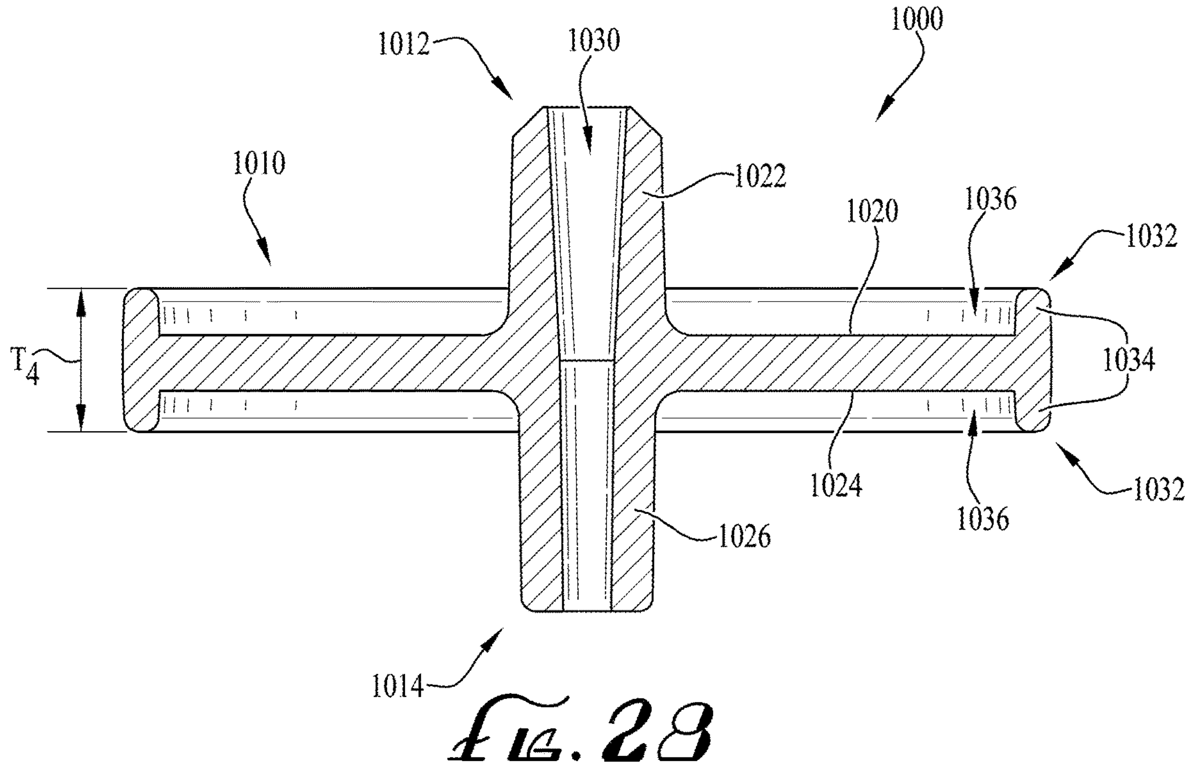
FIG. 28 shows a cross-sectional view of a fluid transfer adapter according to another example embodiment of the present invention.
Figure 29:
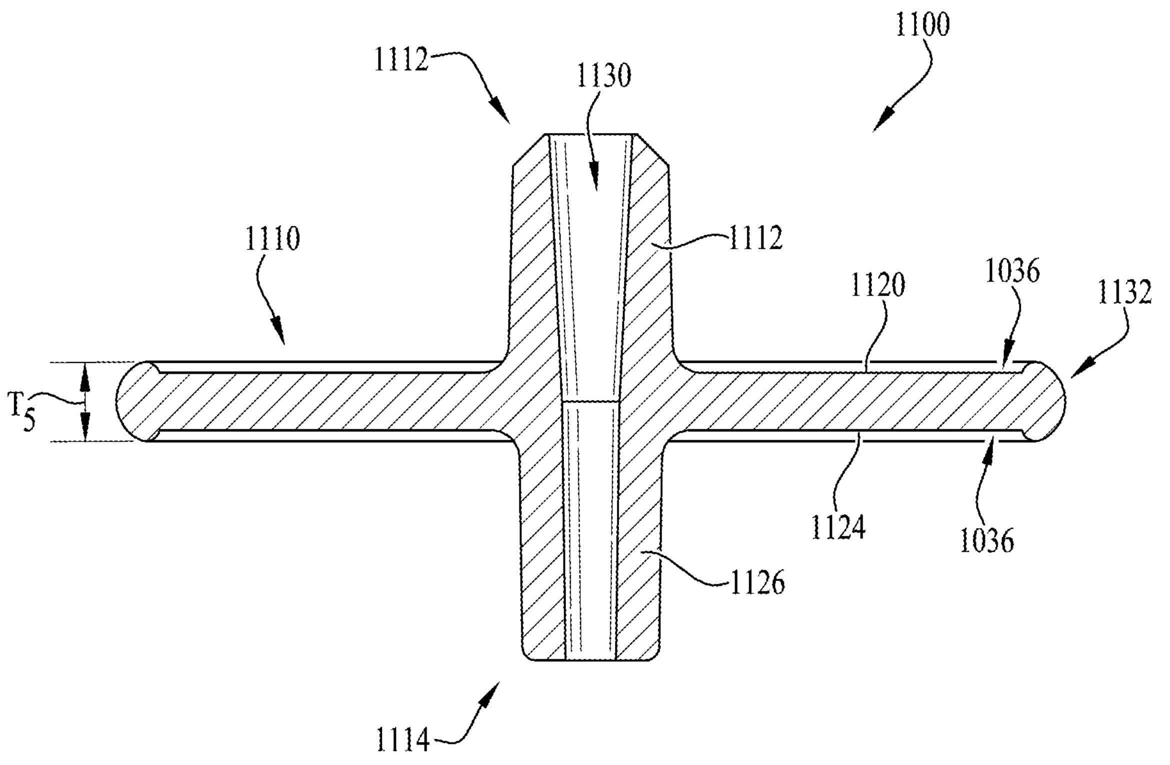
FIG. 29 shows a cross-sectional view of a fluid transfer adapter according to another example embodiment of the present invention.

FIG. 28 shows an adapter 1000 comprising an outer periphery having a T-shaped cross-sectional shape, for example comprising outer rim extensions 1034 extending oppositely therefrom towards their respective ends 1012, 1014. According to one example embodiment, the thickness $T_4$ is between about 3-8 millimeters. FIG. 29 shows an adapter 1100 according to another example embodiment of the present invention. As depicted, the body 1110 comprises a radiused outer periphery 1132 and recesses 1036. According to one example embodiment, the radiused outer periphery 1132 protrudes at least partially above the first and second surfaces 1120, 1124 and defines a thickness $T_5$ of between about 1-4 millimeters. According to one example embodiment, the at least partially raised radiused outer periphery 1132 provides a gripping feature.

While the invention has been described with reference to preferred and example embodiments, it will be understood by those skilled in the art that a variety of modifications, additions and deletions are within the scope of the invention, as defined by the following claims.

What is claimed is:

1. A fluid transfer lid comprising:

a circular top panel;

a female enteral-only coupling comprising a length and extending longitudinally along a first axis from the circular top panel in a first direction, the first coupling comprising a lumen extending axially along the first axis therethrough;

an attachment collar extending in a second direction from the circular top panel, an internal circumferential face thereof being threaded to releasably engage corresponding threads of a container;

a first tether;

an adapter tethered to the attachment collar by the first tether, the adapter comprising a male ISO 80369-3 compatible coupling and a male enteral-only coupling axially aligned and oppositely extending from a central flange member, wherein the male enteral-only coupling of the adapter is configured to mate with the female enteral-only coupling;

a second tether; and a closure tethered to the adapter by the second tether.

2. The fluid transfer lid of claim 1, wherein the first tether and the second tether each extend from the central flange member.

3. The fluid transfer lid of claim 1, wherein the closure is adapted to seal with the male ISO 80369-3 compatible coupling of the adapter.

* * * * *